US012684447B2

(12) United States Patent
Sayed Hassan et al.

(10) Patent No.: US 12,684,447 B2
(45) Date of Patent: Jul. 14, 2026

(54) INTERFERENCE MITIGATION IN TERRESTRIAL NETWORK—NON-TERRESTRIAL NETWORK INTEGRATED SYSTEMS

(71) Applicant: Qualcomm Incorporated, San Diego, CA (US)

(72) Inventors: Mohamad Sayed Hassan, Paris (FR); Jun Ma, San Diego, CA (US); Lianghai Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 418 days.

(21) Appl. No.: 18/235,652

(22) Filed: Aug. 18, 2023

(65) Prior Publication Data

US 2025/0063454 A1 Feb. 20, 2025

(51) Int. Cl.
*H04W 36/32* (2009.01)
*H04B 7/185* (2006.01)
*H04W 64/00* (2009.01)

(52) U.S. Cl.
CPC ...... *H04W 36/322* (2023.05); *H04B 7/18513* (2013.01); *H04W 64/003* (2013.01)

(58) Field of Classification Search
CPC .............. H04W 36/322; H04W 64/003; H04B 7/18513
USPC ........................................................ 455/440
See application file for complete search history.

(56) References Cited

U.S. PATENT DOCUMENTS

| | | | | |
|---|---|---|---|---|
| 2002/0077099 | A1* | 6/2002 | LaPrade | H04B 7/18578 |
| | | | | 455/430 |
| 2015/0062440 | A1* | 3/2015 | Baxter | G06V 40/23 |
| | | | | 348/734 |
| 2024/0049012 | A1* | 2/2024 | Ellis | H04W 24/04 |

* cited by examiner

*Primary Examiner* — Joel Ajayi
(74) *Attorney, Agent, or Firm* — Dinsmore & Shohl LLP

(57) ABSTRACT

Certain aspects of the present disclosure provide techniques for obtaining constellation information and trajectory information of one or more non-terrestrial network (NTN) entities in a NTN; determining a position of a user equipment (UE) in communication with the apparatus; determining a signal projection cone based on the position of the user equipment, a position of the apparatus, and a beam width of a beam used for the communication between the user equipment and the apparatus; determining that the one or more NTN entities are located within the signal projection cone; and transmitting a first signal to the user equipment based on the determination that the one or more NTN entities are located within the signal projection cone.

27 Claims, 14 Drawing Sheets

104 — UE

102a — BS (TN)

140 — NTN

602 — Constellation/Trajectory Info.

604 — Position Info.

606 — Determine Position of UE

608 — Determine Signal Projection Cone

610 — Determine when NTN Entity within Signal Projection Cone

612 — Signal: Modify Uplink Power Control Parameter

614 — Estimate Path Loss

616 — Path Loss Value

618 — Modify Uplink

600

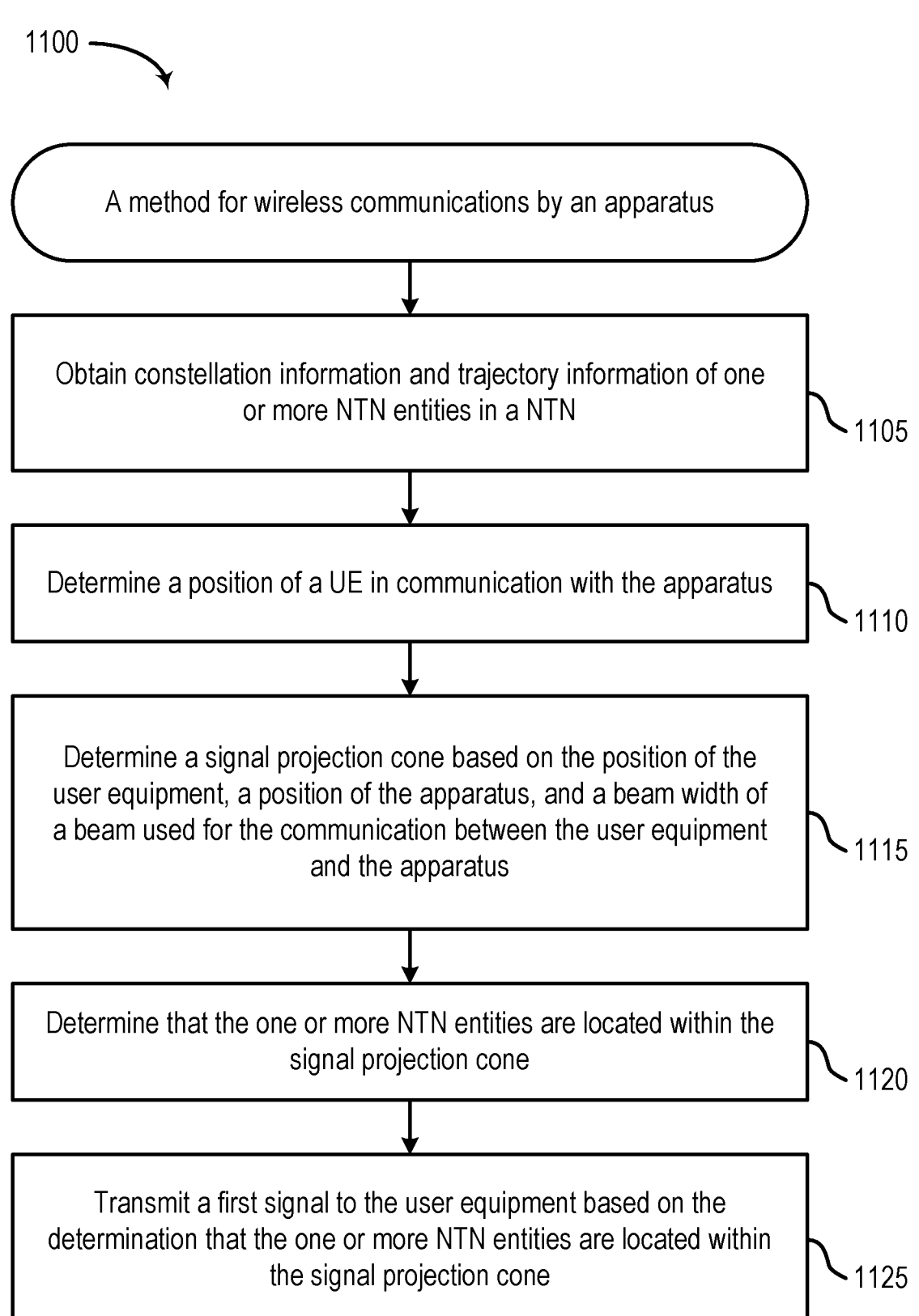

1100

A method for wireless communications by an apparatus

Obtain constellation information and trajectory information of one or more NTN entities in a NTN — 1105

Determine a position of a UE in communication with the apparatus — 1110

Determine a signal projection cone based on the position of the user equipment, a position of the apparatus, and a beam width of a beam used for the communication between the user equipment and the apparatus — 1115

Determine that the one or more NTN entities are located within the signal projection cone — 1120

Transmit a first signal to the user equipment based on the determination that the one or more NTN entities are located within the signal projection cone — 1125

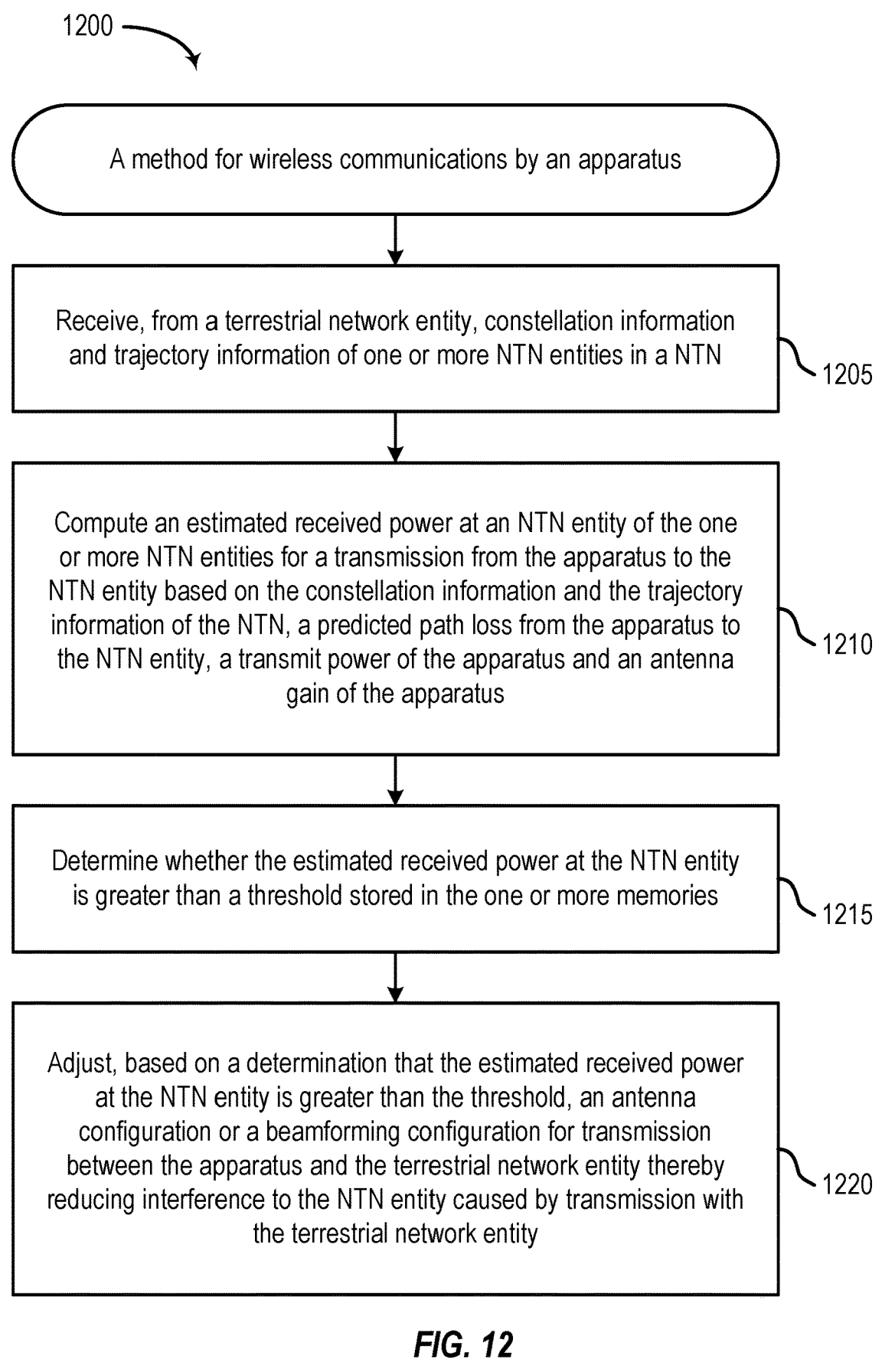

A method for wireless communications by an apparatus

Receive, from a terrestrial network entity, constellation information and trajectory information of one or more NTN entities in a NTN ⟍ 1205

Compute an estimated received power at an NTN entity of the one or more NTN entities for a transmission from the apparatus to the NTN entity based on the constellation information and the trajectory information of the NTN, a predicted path loss from the apparatus to the NTN entity, a transmit power of the apparatus and an antenna gain of the apparatus ⟍ 1210

Determine whether the estimated received power at the NTN entity is greater than a threshold stored in the one or more memories ⟍ 1215

Adjust, based on a determination that the estimated received power at the NTN entity is greater than the threshold, an antenna configuration or a beamforming configuration for transmission between the apparatus and the terrestrial network entity thereby reducing interference to the NTN entity caused by transmission with the terrestrial network entity ⟍ 1220

*FIG. 12*

INTERFERENCE MITIGATION IN TERRESTRIAL NETWORK—NON-TERRESTRIAL NETWORK INTEGRATED SYSTEMS

INTRODUCTION

Field of the Disclosure

Aspects of the present disclosure relate to wireless communications, and more particularly, to techniques for mitigating interference towards a non-terrestrial network entity based on transmissions from a user equipment to a terrestrial network entity.

DESCRIPTION OF RELATED ART

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by an apparatus. The method includes obtaining constellation information and trajectory information of one or more non-terrestrial network (NTN) entities in a NTN; determining a position of a user equipment (UE) in communication with the apparatus; determining a signal projection cone based on the position of the user equipment, a position of the apparatus, and a beam width of a beam used for the communication between the user equipment and the apparatus; determining that the one or more NTN entities are located within the signal projection cone; and transmitting a first signal to the user equipment based on the determination that the one or more NTN entities are located within the signal projection cone.

Another aspect provides a method for wireless communications by an apparatus. The method includes receiving, from a terrestrial network entity, constellation information and trajectory information of one or more NTN entities in a NTN; computing an estimated received power at an NTN entity of the one or more NTN entities for a transmission from the apparatus to the NTN entity based on the constellation information and the trajectory information of the NTN, a predicted path loss from the apparatus to the NTN entity, a transmit power of the apparatus and an antenna gain of the apparatus; determining whether the estimated received power at the NTN entity is greater than a threshold stored in the one or more memories; and adjusting, based on a determination that the estimated received power at the NTN entity is greater than the threshold, an antenna configuration or a beamforming configuration for transmission between the apparatus and the terrestrial network entity thereby reducing interference to the NTN entity caused by transmission with the terrestrial network entity.

Other aspects provide: one or more apparatuses operable, configured, or otherwise adapted to perform any portion of any method described herein (e.g., such that performance may be by only one apparatus or in a distributed fashion across multiple apparatuses); one or more non-transitory, computer-readable media comprising instructions that, when executed by one or more processors of one or more apparatuses, cause the one or more apparatuses to perform any portion of any method described herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more computer program products embodied on one or more computer-readable storage media comprising code for performing any portion of any method described herein (e.g., such that code may be stored in only one computer-readable medium or across computer-readable media in a distributed fashion); and/or one or more apparatuses comprising one or more means for performing any portion of any method described herein (e.g., such that performance would be by only one apparatus or by multiple apparatuses in a distributed fashion). By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 11 depicts a method for wireless communications.

FIG. 12 depicts another method for wireless communications.

DETAILED DESCRIPTION

Figure 1:
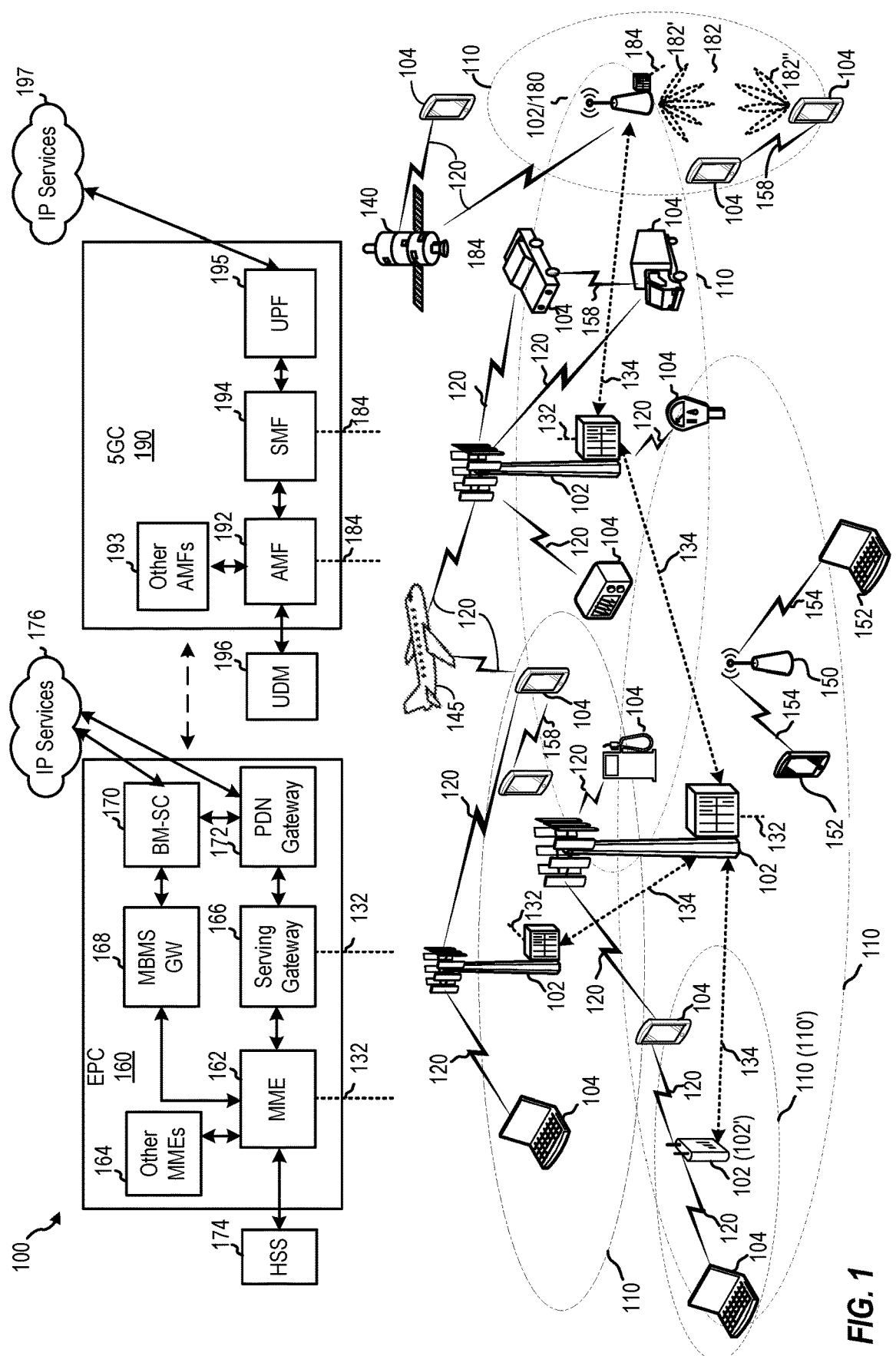
FIG. 1 depicts an example wireless communications network.

Aspects of the present disclosure provide apparatuses, methods, processing systems, and computer-readable mediums for mitigating interference towards a non-terrestrial network entity based on transmissions from a user equipment to a terrestrial network entity.

Wireless communications networks involve many moving aspects that are in communication with each other. For example, personal mobile devices, such as mobile phones and tablets may be used by an individual while they are on the move thus changing position within a TN with reference to a BS, for example. Other moving aspects may include, vehicles are configured with a communication device and in communication with other user equipments and/or BSs. As the vehicle moves the beamformed signals from the vehicle to the other user equipments and/or BSs change. Furthermore, NTN entities such as satellites or airplanes change position with respect to the surface of the Earth and thus with respect to TN entities as the Earth rotates and the NTN entities fly or orbit the Earth. Additionally, as more aspects are enabled with wireless communication capabilities, there is a need to continue to increase the capacity of wireless communications networks. The integration of non-terrestrial networks (NTNs) and terrestrial networks (TNs) provides a means for increasing capacity of wireless communications networks. In doing so, spectrum sharing is permitted between entities of TNs and NTNs. For example, TNs and NTNs can coexist within S-band, FR3 band, Ka band, and others. However, the integration of TNs and NTNs along with permissible spectrum sharing is not without technical challenges. As aspects move throughout the wireless communications network, instances of co-channel interference in TN-NTN integrated systems can limit the benefits of increasing communication capacity within the wireless communications network.

For example, uplink (UL) transmissions from a user equipment (UE) to a TN entity can cause interference with a NTN entity's transmission capabilities when the NTN entity exists within a projection cone of the UE's UL transmission. The projection cone of the UE's UL transmission and how the aforementioned inference arise may be understood by the following discussion regarding the behavior of TNs and NTNs in a wireless communications network.

NTN entities may exist within one of several orbits about Earth, such as a low, medium, or high-Earth orbit, a polar orbit, a geosynchronous orbit, or other orbit. NTN entities transmit and receive signals, for example within the shared spectrum, with terrestrial aspects throughout their orbit. Additionally, terrestrial aspects such as vehicles, mobile devices, or other UEs move about a terrestrial environment of Earth while in communication with one or more other terrestrial aspects such as other UEs and/or one or more base stations (BSs). From time to time, the communication path between an NTN entity and a TN aspect aligns with or falls within a projection of a path of a UE's UL transmission to another TN aspect. When the UE's UL transmission and NTN entity are operating within the shared spectrum and the NTN is in the signal projection cone of the UE's UL transmission, for example, interference arises causing technical problems such as lower signal-to-interference-plus-noise ratio (SNIR) value which maps to a lower throughput.

To mitigate the interference, technical solutions for controlling operations corresponding to the transmission by a UE are provided herein. In aspects described in more detail herein, the signal projection cone for a UE's UL transmission is determined and associated with the trajectory of NTN entities to determine which NTN entity and when an NTN entity will be operating with the signal projection cone. The signal projection cone can be determined based on the position of the UE and the position of the other TN aspect (e.g., a BS) that the UE is communicating. When an NTN entity is determined to be operating within the signal projection cone various technical measures can be implemented to mitigate interference. For example, the UE may consider the NTN entity interference, such as the path loss from the NTN entity to the UE in the UL power control procedure. In some aspects, the UE can be signaled to switch between one or more transmission and reception points (e.g., BSs) within a terrestrial coverage area so that UL transmissions from the UE to the TN aspects do not create a transmission signal projection cone involving the NTN entity. Further, in some aspects, when it is determined that the NTN entity is within the signal projection cone of the UE's UL transmission, adjustments to the UE's antenna configuration or beamforming configuration are made to reduce or null the interference, for example, from a main lobe of the a beam of the UE.

The technical solutions of controlling the transmission of a UE, for example, as introduced above, and described herein in more detail, provide the technical benefit of enabling integration of TNs and NTNs with shared spectrum to increase the capacity and coverage area of wireless communications networks. Furthermore, the technical solutions provided herein do not require the implementation and use of advanced receiver equipment such as a successive interference cancelation (SIC) receiver, thus providing solutions that can be readily implemented without changes to hardware equipment within the wireless communications network.

Introduction to Wireless Communications Networks

The techniques and methods described herein may be used for various wireless communications networks. While aspects may be described herein using terminology commonly associated with 3G, 4G, 5G, 6G, and/or other generations of wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). As such communications devices are part of wireless communications network 100, and facilitate wireless communications, such communications devices may be referred to as wireless communications devices. For example, various functions of a network as well as various devices associated with and interacting with a network may be considered network entities. Further, wireless communications network 100 includes terrestrial aspects, such as ground-based network entities (e.g., BSs 102), and non-terrestrial network aspects (also referred to herein as non-terrestrial network entities 140), such as satellite 142 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, data centers, or other similar devices. UEs 104 may also be referred to more generally as a mobile device, a wireless device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Generally, a cell may refer to a portion, partition, or segment of wireless communication coverage served by a network entity within a wireless communication network. A cell may have geographic characteristics, such as a geographic coverage area, as well as radio frequency characteristics, such as time and/or frequency resources dedicated to the cell. For example, a specific geographic coverage area may be covered by multiple cells employing different frequency resources (e.g., bandwidth parts) and/or different time resources. As another example, a specific geographic coverage area may be covered by a single cell. In some contexts (e.g., a carrier aggregation scenario and/or multi-connectivity scenario), the terms "cell" or "serving cell" may refer to or correspond to a specific carrier frequency (e.g., a component carrier) used for wireless communications, and a "cell group" may refer to or correspond to multiple carriers used for wireless communications. As examples, in a carrier aggregation scenario, a UE may communicate on multiple component carriers corresponding to multiple (serving) cells in the same cell group, and in a multi-connectivity (e.g., dual connectivity) scenario, a UE may communicate on multiple component carriers corresponding to multiple cell groups.

Figure 2:
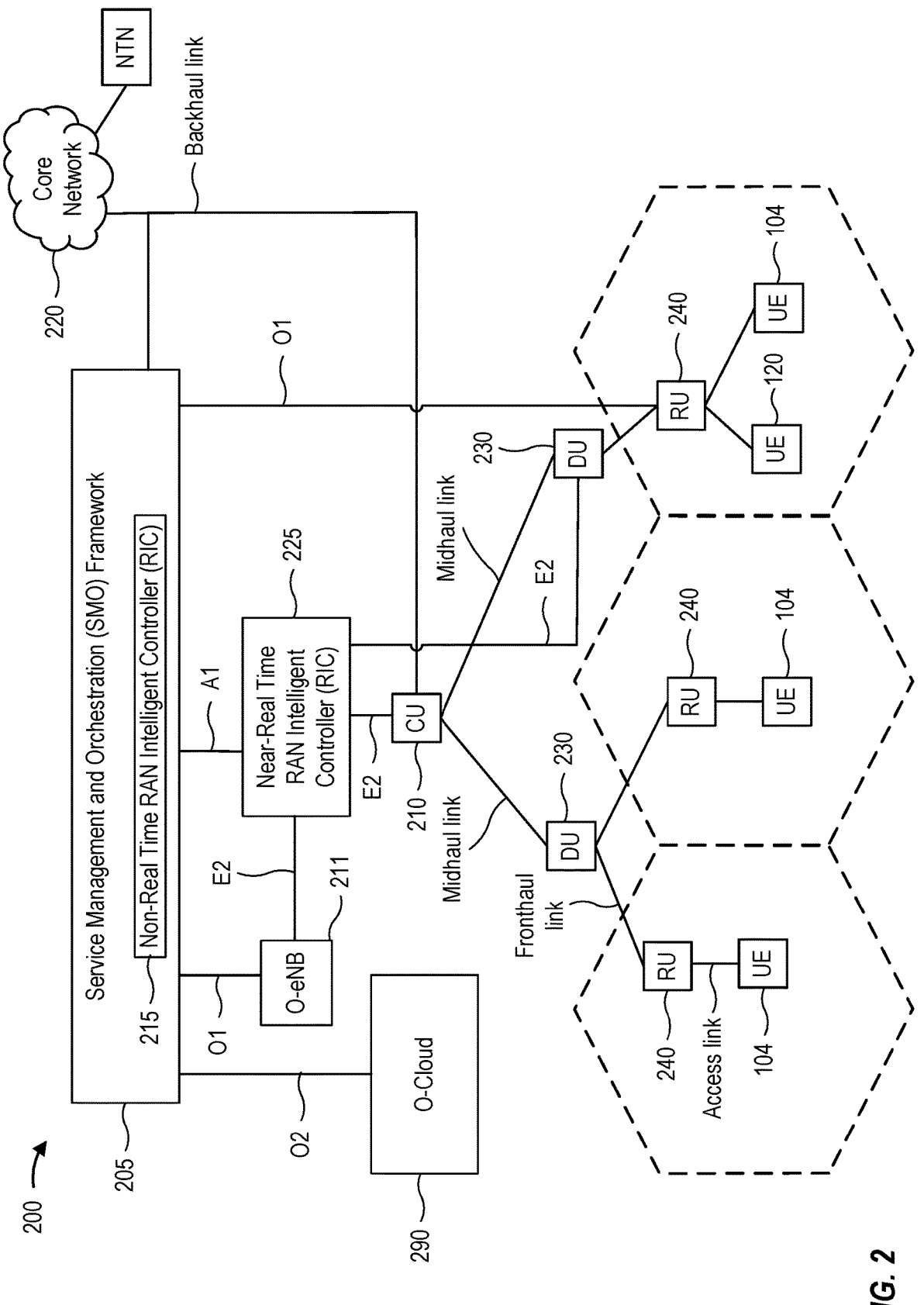
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5GNR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410

MHz-7125 MHz, which is often referred to (interchangeably) as "Sub-6 GHz". Similarly, 3GPP currently defines Frequency Range 2 (FR2) as including 24,250 MHz-71,000 MHz, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more DUs 230 and/or one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
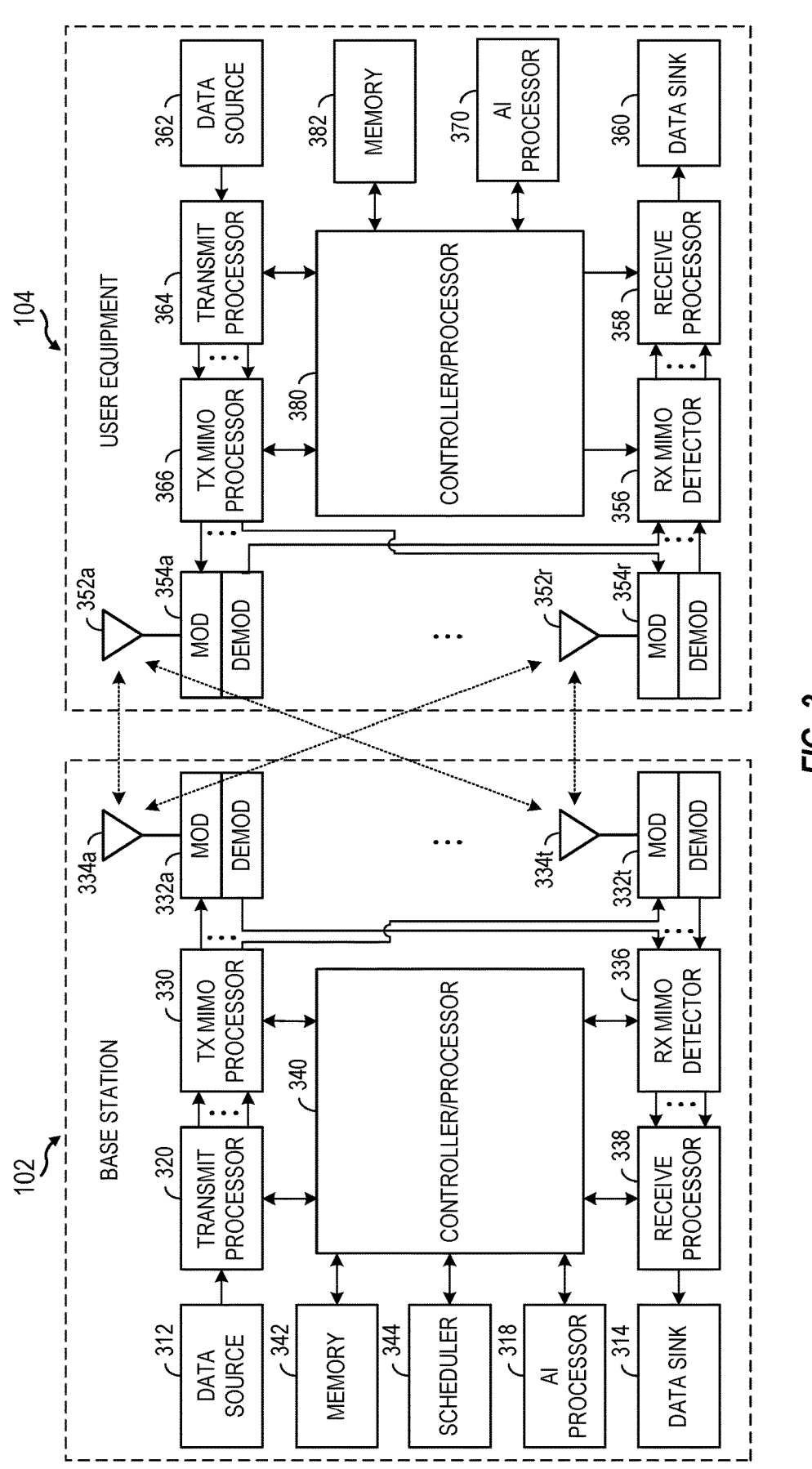
FIG. 3 depicts aspects of an example base station and an example user equipment (UE).

FIG. 3 depicts aspects of an example BS 102 and a UE 104.

Generally, BS 102 includes various processors (e.g., 318, 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 314). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, 370, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

RX MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a RX MIMO detector 336 if applicable, and further processed by a receive processor 338 to obtain decoded data and control information sent by UE 104. Receive processor 338 may provide the decoded data to a data sink 314 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RXMIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

In various aspects, artificial intelligence (AI) processors 318 and 370 may perform AI processing for BS 102 and/or UE 104, respectively. The AI processor 318 may include AI accelerator hardware or circuitry such as one or more neural processing units (NPUs), one or more neural network processors, one or more tensor processors, one or more deep learning processors, etc. The AI processor 370 may likewise include AI accelerator hardware or circuitry. As an example, the AI processor 370 may perform AI-based beam management, AI-based channel state feedback (CSF), AI-based antenna tuning, and/or AI-based positioning (e.g., global navigation satellite system (GNSS) positioning). In some cases, the AI processor 318 may process feedback from the UE 104 (e.g., CSF) using hardware accelerated AI inferences and/or AI training. The AI processor 318 may decode compressed CSF from the UE 104, for example, using a hardware accelerated AI inference associated with the CSF. In certain cases, the AI processor 318 may perform certain RAN-based functions including, for example, network planning, network performance management, energy-efficient network operations, etc.

FIGS. 4A, 4B, 4C, and 4D depict aspects of data structures for a wireless communications network, such as wireless communications network 100 of FIG. 1.

Figures 4A, 4B, 4C, 4D:
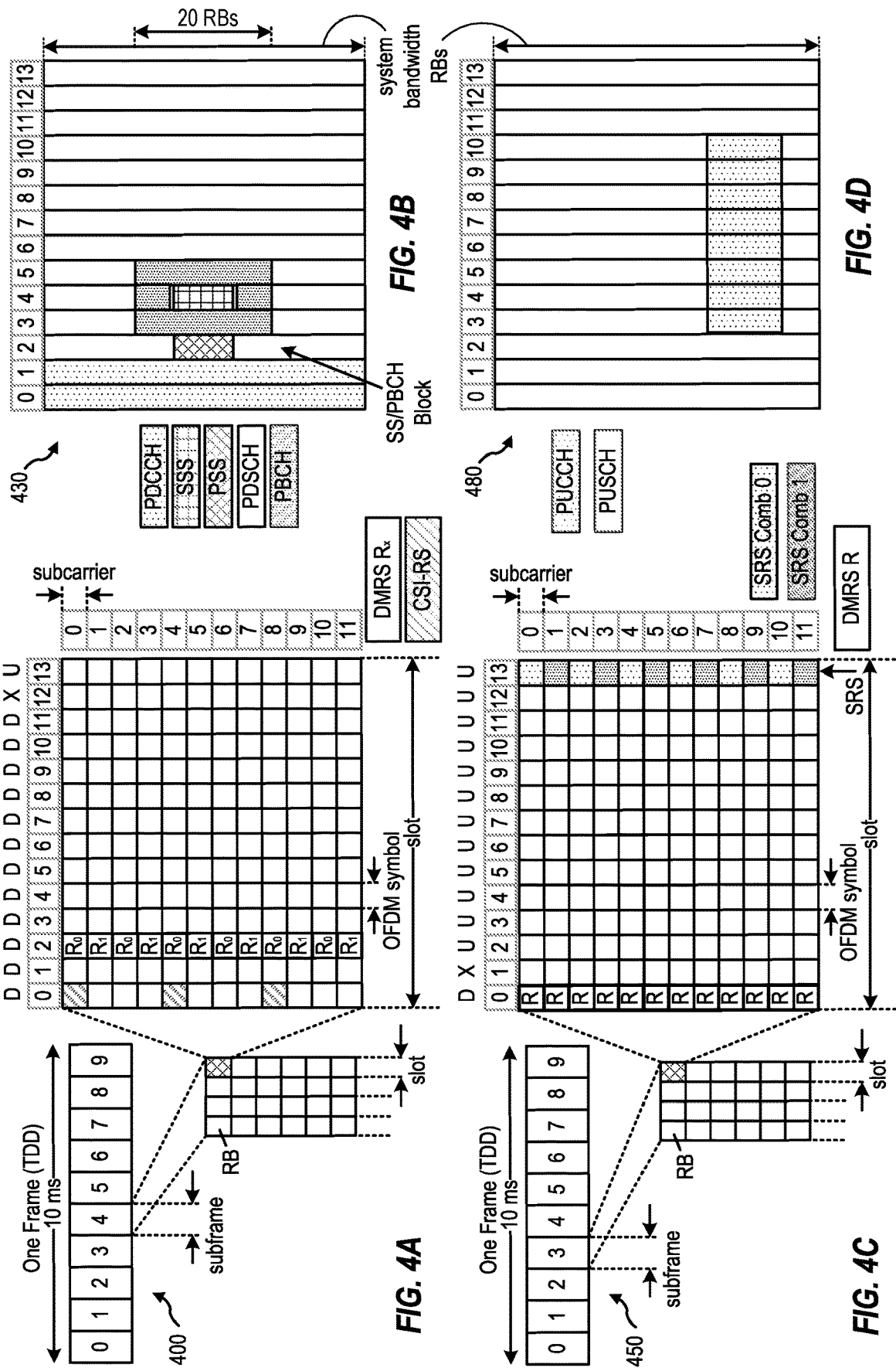
FIGS. 4A, 4B, 4C, and 4D depict various example aspects of data structures for a wireless communications network.

In particular, FIG. 4A is a diagram 400 illustrating an example of a first subframe within a 5G (e.g., 5GNR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 12 or 14 symbols, depending on the cyclic prefix (CP) type (e.g., 12 symbols per slot for an extended CP or 14 symbols per slot for a normal CP). Subframes may also include mini-slots, which generally have fewer symbols than an entire slot. Other wireless communications technologies may have a different frame structure and/or different channels.

In certain aspects, the number of slots within a subframe (e.g., a slot duration in a subframe) is based on a numerology, which may define a frequency domain subcarrier spacing and symbol duration as further described herein. In certain aspects, given a numerology $\mu$, there are $2^\mu$ slots per subframe. Thus, numerologies ($\mu$) 0 to 6 may allow for 1, 2, 4, 8, 16, 32, and 64 slots, respectively, per subframe. In some cases, the extended CP (e.g., 12 symbols per slot) may be used with a specific numerology, e.g., numerology 2 allowing for 4 slots per subframe. The subcarrier spacing and symbol length/duration are a function of the numerology. The subcarrier spacing may be equal to $2^\mu \times 15$ kHz, where is the numerology 0 to 6. As an example, the numerology $\mu=0$ corresponds to a subcarrier spacing of 15 kHz, and the numerology $\mu=6$ corresponds to a subcarrier spacing of 960 kHz. The symbol length/duration is inversely related to the subcarrier spacing. FIGS. 4A, 4B, 4C, and 4D provide an example of a slot format having 14 symbols per slot (e.g., a normal CP) and a numerology $\mu=2$ with 4 slots per subframe. In such a case, the slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme including, for example, quadrature phase shift keying (QPSK) or quadrature amplitude modulation (QAM).

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Mitigating Interference with a Non-Terrestrial Network Entity Based on Transmissions from a User Equipment to a Terrestrial Network Entity An example wireless communication network is depicted and described herein with respect to FIG. 1. As discussed, wireless communications network 100 includes a terrestrial network having terrestrial aspects, such as ground-based network entities (e.g., BSs 102), and a non-terrestrial network configured to communicate with aspects of the terrestrial network. The non-terrestrial network includes non-terrestrial network entities 140, such as satellite 142 and aircraft 145, which may include network entities on-board (e.g., one or more BSs) capable of communicating with other network elements (e.g., terrestrial BSs) and UEs.

Figure 5:
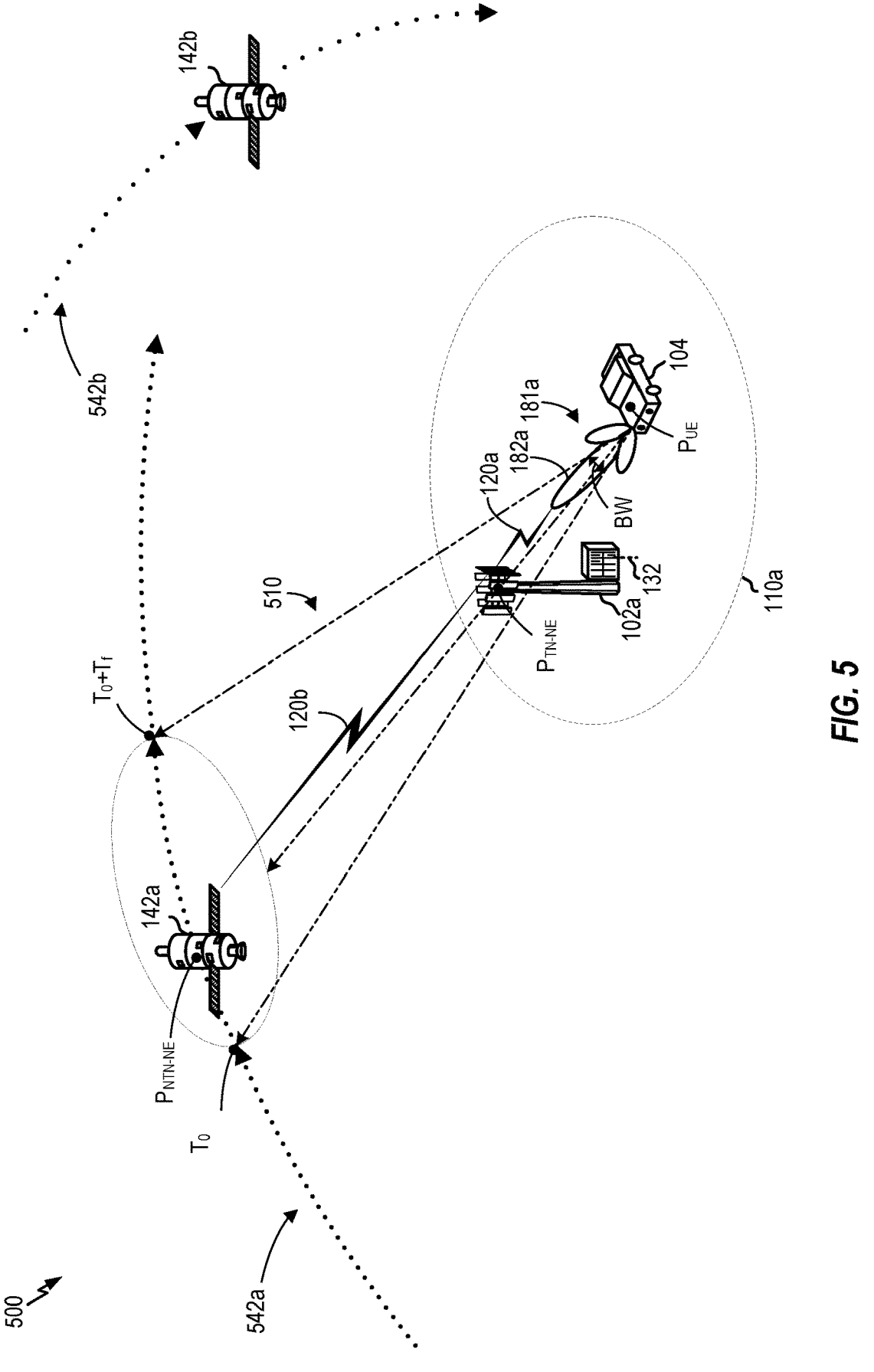
FIG. 5 depicts an example wireless communications network where interference between a TN entity and an NTN entity exists.
Figure 7:
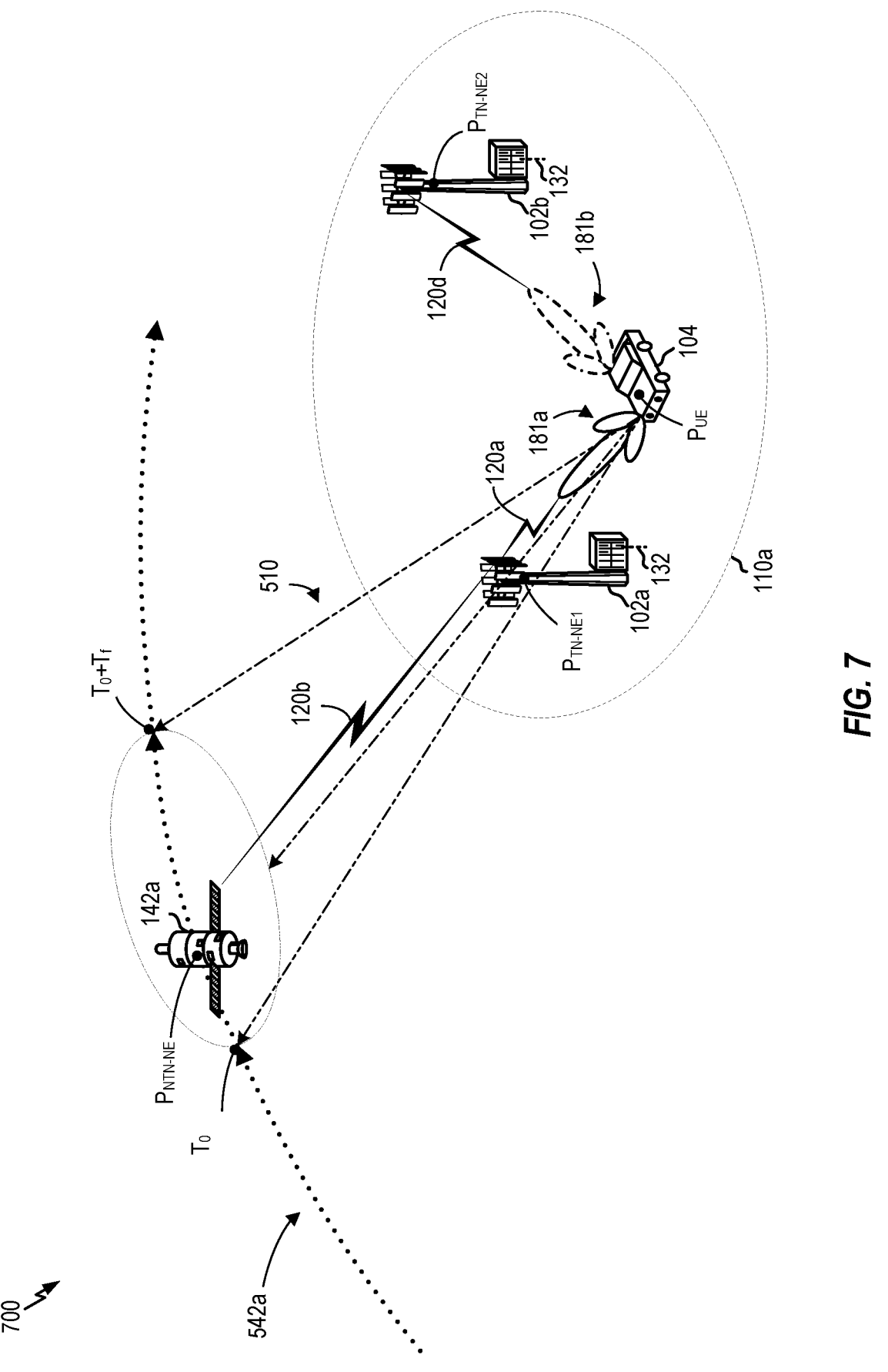
FIG. 7 depicts an additional example wireless communications network where interference between a TN entity and an NTN entity exists.
Figure 9:
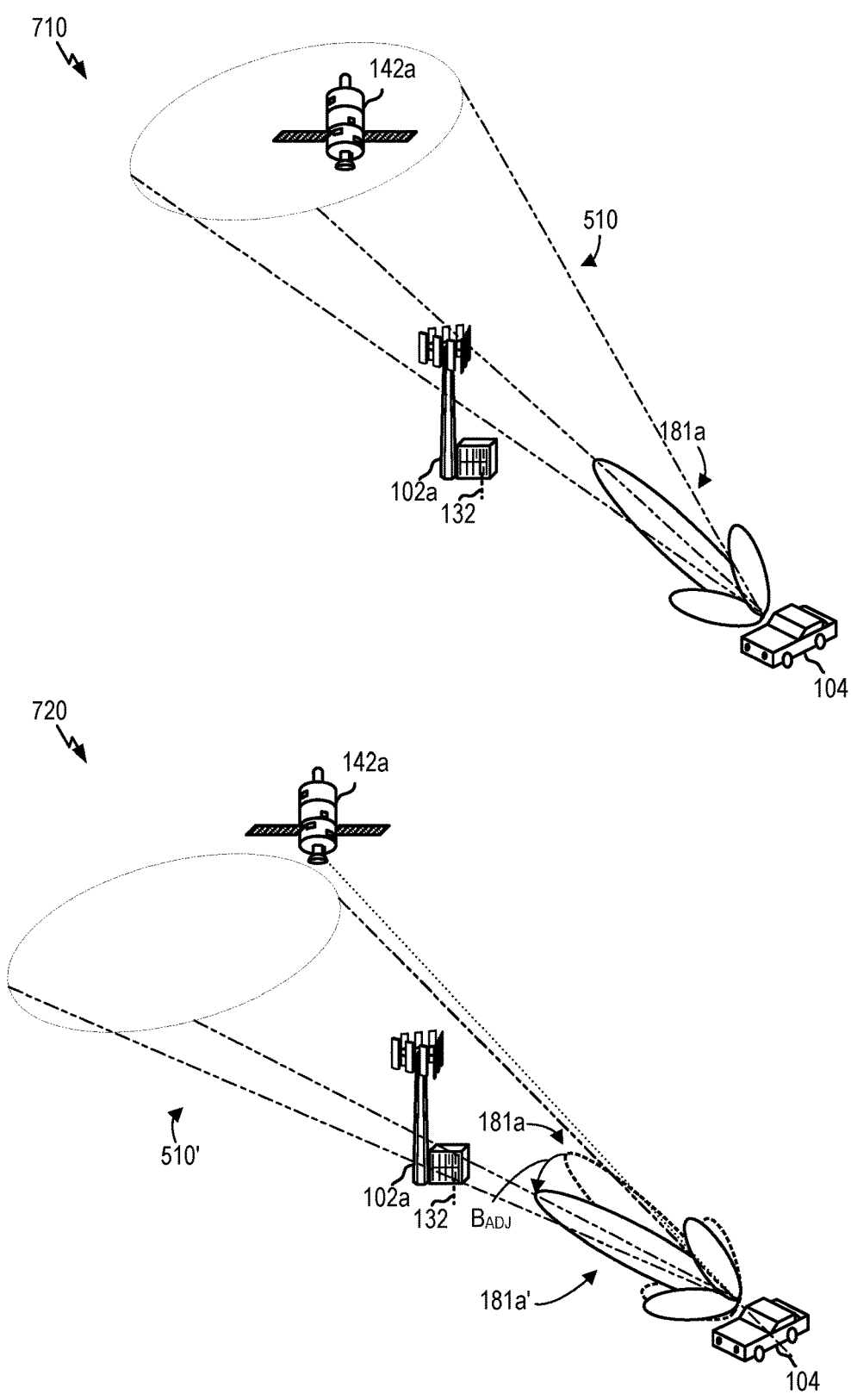
FIG. 9 depicts a further example wireless communications network where interference between a TN entity and an NTN entity exists.

FIGS. 5, 7 and 9 depict various configurations of terrestrial network entities (e.g., BSs 102 and UEs 104) and non-terrestrial network (NTN) entities 140 where interference with the NTN entity 140 arises from transmission such as those from a UE 104 to a TN BS 102. Techniques for mitigating the interference will now be discussed in detail with reference to the figures.

FIG. 5 depicts an instance of wireless communications network 500 where a UE 104 causes interference with an NTN entity 142a. More specifically, FIG. 5 illustrates the scenario where an uplink (UL) transmission from a UE 104 to a TN entity (e.g., a BS 102) encompasses a first NTN entity 142a within a signal projection cone 510 extending from a main lobe 182a of beamformed signal to a BS 102a. That is, the beamformed signal 181a establishes a communication link 120a from the UE 104 to the BS 102a. However, since the main lobe 182a (or at least some portion of it) points away from the surface of Earth toward space, and more specifically, toward the first NTN entity 142a an interference scenario arises. Comparatively, an interference scenario is not present between the UE 104 and a second NTN entity 142b since the beamformed signal 181a does not point in the direction of the second NTN entity 142b.

The depicted scenario is not persistent because the first NTN entity 142a moves along a first orbital trajectory 542a and similarly the second NTN entity 142b moves along another orbital trajectory 542b. However, the interference may persist for a period of time causing issues with transmissions to and from the first NTN entity 142a.

An interference mitigating technique for the scenario depicted in FIG. 5 will now be described in view of the process flow 600 depicted in FIG. 6. The interference mitigating technique may include a TN based solution whereby the UE 104 is signaled and/or configured to consider the path loss of the first NTN entity 142a caused by the beamformed signal 181a in the UE's UL power control procedure.

Figure 6:
FIG. 6 depicts a process flow for mitigating interference with an NTN entity.

For example, at step 602 in FIG. 6, the TN, for example, via a TN entity such as a BS 102a receives constellation information and trajectory information for an NTN via a communications link 120b. In some instances, the TN can retrieve the constellation information and the trajectory information for NTN entities 140 in the NTN from one or more memory components communicatively coupled to the TN.

The constellation information and the trajectory information may include real-time NTN entity position and trajectory (e.g., 542a and 542b). This may be contained or defined by an orbital propagation model or the like. The constellation information provides information such as the number of NTN entities 140 in the NTN and optionally their respective positions (e.g., $P_{NTN-NE}$ depicted in FIG. 5). The trajectory information includes orbital trajectory 542a and 542b for each of the NTN entities 140.

In some aspects, the constellation information and the trajectory information is routed from the NTN to the TN using an application layer. For example, an application function (AF) can communicate the NTN attributes (e.g., the constellation information and the trajectory information) to the policy control function (PCF) that manages Quality of Service (QoS). The PCF can connect and provide policy and NTN attributes to a centralized unit or other unit of the radio access network, for example, via a SMF. In some instances, the constellation information and the trajectory information can be routed from the NTN to the TN via a core network (CN) (e.g., core network 220 shown and described with reference to FIG. 2) function such as Operation and Maintenance (O&M) and/or Network Exposure Function (NEF). For example, the CN may transmit the NTN attributes to RAN via an NG interface. In further instances, in an integrated TN-NTN network, the NTN attributes may be sent from a gNB associated with an NTN entity to a gNB associated with a TN entity (e.g., a BS 102a) via an Xn interface.

At step 604, the positon information of one or more UEs 104 is received by the TN. The position information (e.g., $P_{UE}$ depicted in FIG. 5) of the one or more UEs 104 may be determined based on positioning features supported by 3GPP. such as global positioning system (GPS), Global'naya Navigatsionnaya Sputnikovaya Sistema (GLO-NAS), or others, for example. Based on the position information ($P_{UE}$), at step 606, the TN is configured to determine the real-time position of the UE. At step 608, the TN determines a signal projection cone 510 for one or more of the UEs 104 communicating with the BS 102a. The geometry of the signal projection cone 510 is determined using the position information ($P_{UE}$) of the UE 104, the position ($P_{TN-NE}$) of the BS 102a, and a beam width BW of the main lobe 182a of the beamformed signal 181a. Beam width BW is measured at the angle between two points on either side of the main lobe 182a at a predefined power point, such as −3 dB, −6 dB or the like, where the power radiated signal drops to the predefined power level from its maximum value. The beam width BW may be measured in degrees, and it may be measured in the horizontal plane and/or the vertical plane. For example, a center line of the signal projection cone 510 may be defined by a line that extends from the position information $P_{UE}$ of the UE 104 towards the positon $P_{TN-NE}$ of the BS 102a. Additionally, the beam width BW defines the angle of the signal projection cone 510. Moreover, while the term "cone" is used in referring to the signal projection cone 510, the signal projection may be defined by a more complex volume in some instances.

At step 610, the TN determines when an NTN entity 142a is present within the signal projection cone 510 based on the geometry of the signal projection cone 510 and the constellation information and the trajectory information of entities in the NTN. For example, the constellation information defines the position $P_{NTN-NE}$ of the NTN entity 142a and the trajectory 542a of an NTN entity 142a defines the movement of the NTN entity 142a through space. The determination of when the NTN entity 142a will be present within the signal projection cone 510 may be defined by a time $T_0$ when the NTN entity 142a enters the signal projection cone 510, a timeframe $T_f$ corresponding to how long the NTN entity 142a persists within the signal projection cone 510, and an exit time $T_0+T_f$ in which the NTN entity 142a leaves the signal projection cone 510. When the NTN entity 142a is determined to be within the signal projection cone 510, at step 612, the TN may signal the UE 104 to consider the NTN interference for UL power control procedures. For example, a new term β can be included as an information element (IE) to P0-PUSCH-AlphaSet in a PUSCH-PowerControl, for example, as specified in 3GPP standards for transmit power controls. For example, the power of the output antenna (P) may be defined as follows:

$$P = \left\{ \begin{array}{c} P_{max} \\ P_0 + \alpha PL_{TN} + \beta PL_{NTN} + 10\log_{10}(2^\mu * N_{PRB}) + \Delta + f_b \end{array} \right\},$$

where $PL_{NTN}$ is the path loss from the NTN entity 142a to the UE 104.

In some instances, the UE 104 may measure the $PL_{NTN}$ using a configured SS/PBCH Block Measurement Timing Configuration (SMTC) window. Alternatively, in other instances, at step 614, the TN can compute the estimated $PL_{NTN}$ based on the positon $P_{TN-NE}$ of the BS 102a and the position information $P_{UE}$ of the UE 104. At step 616, the TN signals the estimated $PL_{NTN}$ to the UE 104 using downlink (DL) MAC-CE or a new DCI IE. With the estimated $PL_{NTN}$, the UE 104 can perform a UL power control procedure at step 618 to modify an uplink power control parameter that reduces the interference with the NTN entity 142a.

In addition to modifying the uplink power control parameter or in other instances the UE may be within a communication coverage area 110a that includes multiple transmission and reception points (TRPs) (e.g., BS 102a and BS 102b) forming the TN.

FIG. 7 depicts an instance of wireless communication network 700, similar to the wireless communications network 500, where a UE 104 that causes interference with an NTN entity 142a operates in communication coverage area 110a having two more transmission and reception points (TRPs) (e.g., BS 102a and BS 102b) forming aspects of the TN. In a multiple TRP deployment, non-collocated TRPs can be linked to the same baseband. In such configurations, the UE 104 may be connected to two TRPs where UL transmissions are simultaneously sent to two or more TRPs, which is referred to as UL simultaneous transmission across multi-panel (STxMP). For example, UE 104 communicates with a first TRP (e.g., BS 102a) via a first communications link 120a using a beamformed signal 181a and simultaneously with a second TRP (e.g., BS 102b) via a second communications link 120b using a beamformed signal 182b. Accordingly, in some instances, the UE 104 may be signaled to communicate with one or more TRPs that do not cause interference with an NTN entity 142a. For example, the UE 104 may be signaled to switch from UL operation in STxMP to single transmission and reception point (s-TRP).

Figure 8:
FIG. 8 depicts a further process flow for mitigating interference with an NTN entity.

FIG. 8 depicts a process flow 800 for mitigating interference with the NTN entity by signaling the UE 104 to switch between TRPs and/or switch from STxMP operation to s-TRP operation.

Steps 802-810 of the process flow 800 correspond to steps 602-610 of the process flow 600 in FIG. 6 and therefore will not be described again. At step 812, based on the geometry of the signal projection cone 510 and the constellation information and the trajectory information of the NTN entity 142a, the TN may determine a timer value that corresponds to the length of time that the NTN entity 142a will be present within the signal projection cone 510.

At step 814, the TN, for example, with the first BS 102a, which is one of the TRPs communicatively linked with the UE 104 in STxMP operation, signals the UE 104 to switch from communication with the TRP that in communication with the UE 104 causes interference with the NTN entity 142a. For example, as illustrated in FIG. 7, communication from the UE 104 to the first BS 102a (e.g., the first TRP) causes interference with the NTN entity 142a. However, communication from the UE 104 to the second BS 102b (e.g., the second TRP) does not create interference with the NTN entity 142a.

Referring back to FIG. 8, at step 814, the first BS 102a (e.g., the first TRP) may also communicate a timer value to the UE 104. The timer value corresponds to a timeframe (e.g., a portion of $T_f$) that the NTN entity 142a exists within the signal projection cone 510. In other words, the timer is the time required for the NTN entity 142a to cross the signal projection cone 510. The proposed dynamic switching or semi-static switching using the timer can be based on an SRS resource set indicator. To enable this, the TN (e.g., the gNB) reconfigures the SRS resource set when the UE 104 to first BS 102a (e.g., first TRP) causes interference with the NTN entity 142a. Additionally, the implementation of the aforementioned timer can reduce the need for many reconfiguration signals and reduce the potential for DL overload. Furthermore, the timer can be signed by RRC configuration.

At step 816, the UE 104 switches UL communication from STxMP operation, for example, which includes communication with the first BS 102a (e.g., the first TRP) and the second BS 102b (e.g., the second TRP) to s-TRP operation, such that the UE 104 communicates only with the second BS 102b (e.g., the second TRP). The UE 104 may continue to operate in s-TRP until the timer expires at step 818. Upon expiration of the timer at step 818, the UE 104 may automatically (e.g., without a further signal from the TN) switch back to STxMP operation. The inclusion of a timer to trigger switching of the UE's 104 UL communications with TRPs of the TN reduces the need for additional signaling from the TN to the UE 104.

However, in some instances, the TN through the second BS 102b (e.g., the second TRP) may signal the UE 104 at step 820 to switch to STxMP operation. At step 822, the UE 104 switches from s-TRP to STxMP operation, either based on timer expiration at step 818 or a signal received from the TN at step 820.

In addition to the aforementioned techniques of reducing or nulling interference with the NTN entity 142a or as a separate implementation, the UE 104 can be signaled to make an adjustment to the beamformed signal 181a. For example, FIG. 9 depicts an adjustment to the beamformed signal 181a to an adjusted beamformed signal 181a' to reduce or null interference with the NTN entity 142a caused by UL communication from the UE 104 to the BS 102a. In particular, diagram 710 depicts the NTN entity 142a within the signal projection cone 510 before an adjustment to the beamformed signal 181a. Diagram 720 depicts the NTN entity 142a located outside of the signal projection cone 510a that corresponds to the adjusted beamformed signal 181a'.

Figure 10:
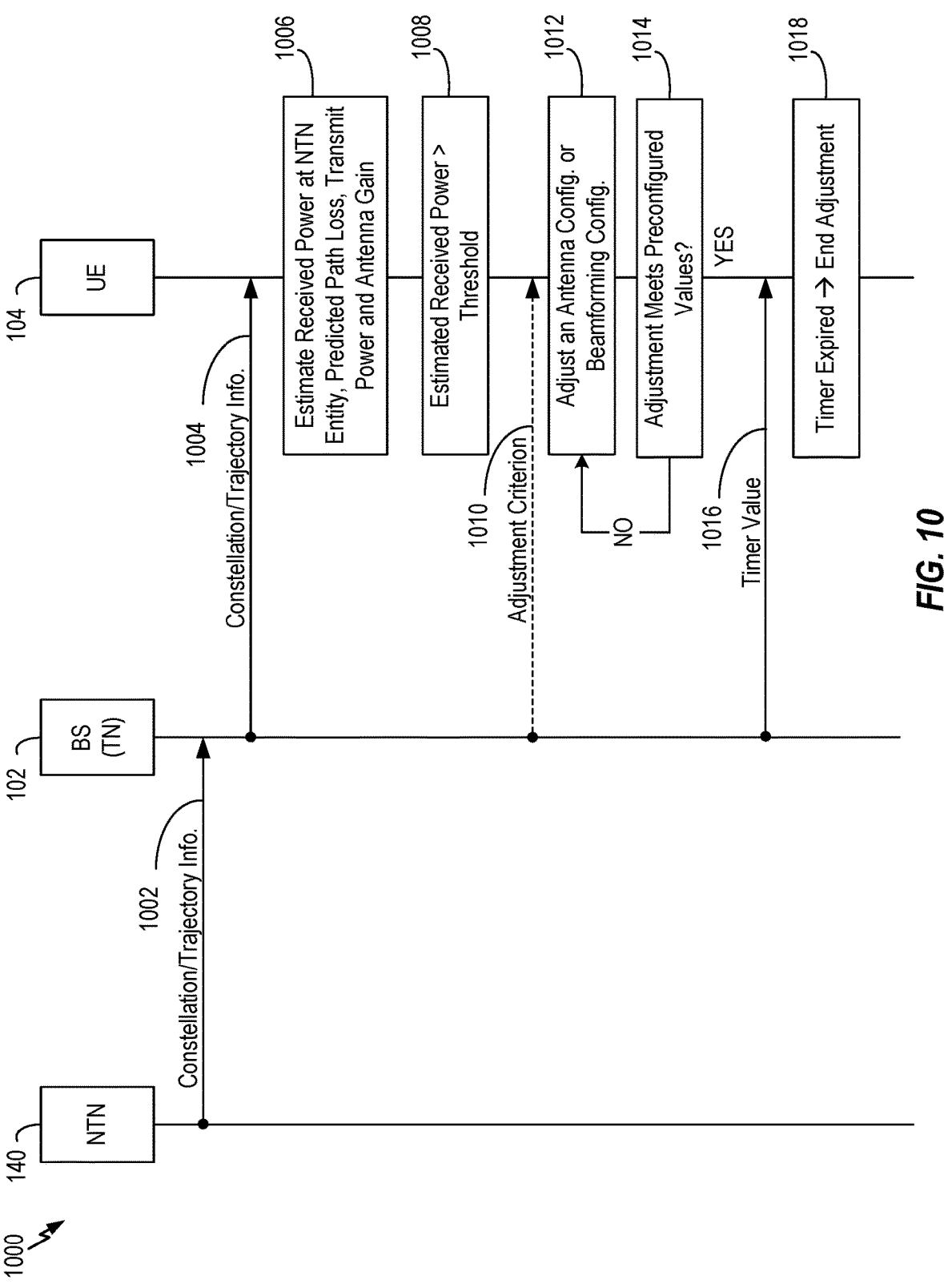
FIG. 10 depicts a process flow for mitigating interference with an NTN by implementing an adjustment to beamforming.

FIG. 10 depicts a process flow 1000 for mitigating interference with the NTN entity 142a by implementing an adjustment to a beamformed signal 181a of a UE 104 to a BS 102a.

At step 1002, which is similar to step 610 of FIG. 6, the TN, for example, a BS 102a receives the constellation information and the trajectory information for an NTN. In some instances, the TN can retrieve the constellation information and the trajectory information for NTN entities 140 in the NTN from one or more memory components communicatively coupled to the TN.

At step 1004, the TN sends and the UE 104 receives the constellation information and the trajectory information for the NTN. In some instances, the UE may be preconfigured At step 1006, the UE 104 can estimate an estimated received power at an NTN entity 142a of the one or more NTN entities for a transmission from the UE 104 to the NTN entity 142a based on the constellation information and the trajectory information of the NTN. The UE 104 may also computed a predicted path loss from the UE 104 to the NTN entity 142a, a transmit power of the UE 104 and an antenna gain of the UE 104.

At step 1008, the UE determines whether the estimated received power at the NTN entity 142*a* exceeds a threshold value, for example, stored in the one or more memories of the UE 104.

In some instances, at step 1010, the TN sends adjustment criterion to the UE 104. For example, the BS 102*a* may determine the adjustments to make to the beamformed signal 181*a* of the UE 104 and send them to the UE 104 to implement. This may be done in place of the UE 104 computing the adjustments. Alternatively, the UE 104 may determine or retrieve from one or more memories of the UE 104 adjustment criterion to reduce the interference with the NTN entity 142*a*. The adjustment criterion includes, for example, if and when an adjustment to the beamformed signal 181*a* is to be adjusted. For example, the if and when to adjust the beamformed signal 181*a* is based on the trajectory of the NTN entity 142*a* through a signal projection cone 510 as depicted for example in FIGS. 5 and 7. The criteria may further include how to adjust an antenna configuration or a beamforming configuration for transmission between the UE 104 and the BS 102*a* to reduce interference to the NTN entity 142*a*. For example, the UE 104 may need to perform adjustment if the estimated antenna gain, the UE's UL transmit power, the path loss to the NTN entity 142*a*, and/or the received signal quality towards the NTN entity 142*a* meets predefined criteria. One or more of the aforementioned determinations are made to ensure that there is a need for controlling the interference from UL signals in the TN to the UL signals of the NTN. Additionally or alternatively, the UE 103 may need to further adjust the antenna configuration or the beamforming configuration for transmission between the UE 104 and the BS 102*a* to ensure that the TN connection remains within an acceptable level of quality.

In some aspects, the NTN attributes (e.g., the constellation information and the trajectory information) and/or the configured criteria may be broadcasted in SIB, and/or transmitted in UE-dedicated message such as a UE-dedicated RRC message. In addition, they may be transmitted in the same message or separately in different messages. In some aspects, transmission of the NTN attributes and/or the configured criterions may only happen within a certain duration, for example, when the TN determines there is a need for controlling the interference, based on the NTN entity's 142*a* real-time location, the location of the serving UE(s) 104, and/or the potential coverage area of the TN cell (e.g., the communication coverage area 110*a* as shown in FIGS. 5 and 7). In another aspect, the transmitted NTN attributes and/or the configured criterions may be associated with a (pre-) configured validity duration. Accordingly, the UE 104 may only perform adjustment within the (pre-)configured validity duration by using the NTN attributes and/or the configured criterions. The validity duration may be defined by a timer value determined by the timeframe which NTN entity 142*a* exists within the signal projection cone 510 depicted in FIGS. 5 and 7, for example. In some aspects, an NTN entity 142*a* (e.g. an NTN entity enabled with gNB functionality) may transmit a request of controlling the interference to the BS 102*a*, where the proposed scheme is triggered upon receiving the request at the TN BS 102*a*. Moreover, the NTN entity 142*a* (e.g. an NTN entity enabled with gNB functionality) may transmit such a request, for example, upon detecting interference from the UE's 104 UL transmission(s) with a BS 102*a*.

At step 1012, the UE 104, for example, in response to one of the aforementioned triggers (e.g., including the estimated received power greater than a threshold as determined in step 1008, or one or more of the other computed parameters from step 1006 being outside of a preconfigured threshold) to make an adjustment to the antenna configuration and/or the beamforming configuration of the UE 104, the UE makes an adjustment to the antenna configuration and/or the beamforming configuration. For example, as depicted in FIG. 9, the UE 104 adjusts the antenna configuration and/or the beamforming configuration so that the beamformed signal 181*a* is modified to an adjusted beamformed signal 181*a'*. As one example, the beamformed signal 181*a* is modified to an adjusted beamformed signal 181*a'* by adjusting the main lobe of the beamformed signal 181*a* by a projection angle $(B_{ADJ})$ thereby forming the adjusted beamformed signal 181*a'*. The projection angle $(B_{ADJ})$ may be determined by using real-time NTN entity 142*a* position information, for example, obtained from an orbital propagation model, the UE's 104 position, antenna characteristics (e.g., the number of radiating elements and/or the orientation of the radiating elements), UL transmit power criteria, the position of the BS 102*a*, and/or information from internal UE models such as a gyroscope or the like configured to indicate an orientation of the UE 104.

At step 1014, the UE 104 determines whether the adjustments to the antenna configuration and/or the beamforming configuration meet preconfigured transmission requirements between the UE 104 and the BS 102*a*. For example, the UE 104 may need to perform a further adjustment, if the (estimated) antenna gain after antenna/beamforming adjustment, the UE's 104 UL transmit power, path loss, and/or received signal quality towards the serving BS 102*a* does not meet certain configured conditions or values. This is done to ensure that the TN connection is good enough after the adjustment. As such, at step 1014, if the adjusted beamformed signal 181*a'* does not meet the preconfigured conditions or values, that is "NO" at step 1014, the process returns to step 1012. However, if the adjusted beamformed signal 181*a'* meets the preconfigured conditions or values, that is "YES" at step 1014, the process proceeds to step 1016.

At step 1016, the TN may provide the UE 104 with a timer value corresponding to a timeframe that the NTN entity 142*a* is within the signal projection cone 510 which further indicates to the UE 104 the duration in which the adjustment is needed to mitigate the interference. At step 1018, the UE 104 determines whether the timer has expired. When the timer expires, the UE 104 may end the adjustment to the beamformed signal 181*a*.

The aforementioned processes thus provide techniques for mitigating interference so that integration of TNs and NTNs with shared spectrum may effectively increase the capacity and coverage area of wireless communications networks. The processes described herein may be implemented independently or in conjunction to mitigate the interference.

Example Operations of Entities in a
Communications Network

FIG. 11 shows a method 1100 for wireless communications by an apparatus, such as BS 102*a* of FIGS. 1, 3, 5, 7, and 9, or a disaggregated base station as discussed with respect to FIG. 2.

Method 1100 begins at step 1105 with obtaining constellation information and trajectory information of one or more NTN entities in a NTN. For example, a BS 102*a* may obtain the constellation information and the trajectory information from the NTN as described with reference to FIGS. 5-6.

Method 1100 then proceeds to step 1110 with determining a position of a UE in communication with the apparatus. For example, the TN may determine the position $P_{UE}$ of the UE 104 from position information provided by the UE 104 to the BS 102a.

Method 1100 then proceeds to step 1115 with determining a signal projection cone based on the position of the user equipment, a position of the apparatus, and a beam width of a beam used for the communication between the user equipment and the apparatus. For example, the signal projection cone 510 depicted in FIG. 5 can be determined as described with reference to step 608 of FIG. 6.

Method 1100 then proceeds to step 1120 with determining that the one or more NTN entities are located within the signal projection cone. For example, whether the NTN entity 142a is within the signal projection cone 510 shown for example in FIG. 5 can be determined as described with reference to step 610 of FIG. 6.

Method 1100 then proceeds to step 1125 with transmitting a first signal to the user equipment based on the determination that the one or more NTN entities are located within the signal projection cone. The first signal may be the signal described with reference to step 612 of FIG. 6.

In certain aspects, the first signal indicates to the user equipment to modify an uplink power control parameter.

In certain aspects, the uplink power control parameter is a path loss value associated with the one or more NTN entities determined to be located within the signal projection cone.

In certain aspects, method 1100 further includes receiving the path loss value from the user equipment.

In certain aspects, method 1100 further includes estimating the path loss value associated with the one or more NTN entities based on the position of the user equipment and the position of the apparatus.

In certain aspects, method 1100 further includes transmitting the estimated path loss value to the user equipment via a downlink MAC-CE.

In certain aspects, method 1100 further includes estimating the path loss value associated with the one or more NTN entities based on the position of the user equipment and the position of the apparatus.

In certain aspects, method 1100 further includes transmitting the estimated path loss value to the user equipment via a DCI IE.

In certain aspects, the apparatus comprises two or more TRP to which the user equipment is connected; the signal projection cone corresponds to a projection of the beam between the user equipment and a first TRP of the two or more TRPs of the apparatus; and the method 1100 further includes transmitting, based on the determination that the one or more NTN entities are located within the signal projection cone corresponding to the projection of the beam between the user equipment and the first TRP of the two or more TRPs of the apparatus, a second signal to the user equipment to switch from STxMP mode with the two or more TRPs to s-TRP mode with a second TRP of the two or more TRPs.

In certain aspects, method 1100 further includes determining a timeframe when the one or more NTN entities are located within the signal projection cone corresponding to the projection of the beam between the user equipment and the first TRP.

In certain aspects, the second signal comprises a timer value corresponding to the timeframe, wherein the timer value indicates to the user equipment a duration to operate in the s-TRP mode before switching back to STxMP mode.

In certain aspects, step 1105 includes receiving, from the NTN via an application function, the constellation information and the trajectory information of the NTN.

In certain aspects, step 1105 includes receiving the constellation information and the trajectory information of the NTN from a terrestrial network via an NG interface.

In certain aspects, step 1105 includes receiving the constellation information and the trajectory information of the NTN from an NTN entity via an Xn interface.

In certain aspects, method 1100 further includes determining a timeframe when the one or more NTN entities are located within the signal projection cone.

In certain aspects, method 1100 further includes transmitting, during the timeframe, the constellation information and the trajectory information of the NTN to one or more user equipments.

In certain aspects, method 1100 further includes receiving, from one of the one or more NTN entities, a request to cause the user equipment to adjust an antenna configuration or a beamforming configuration.

In certain aspects, method 1100 further includes transmitting the constellation information and the trajectory information of the NTN to one or more user equipments based on the received request.

Figure 13:
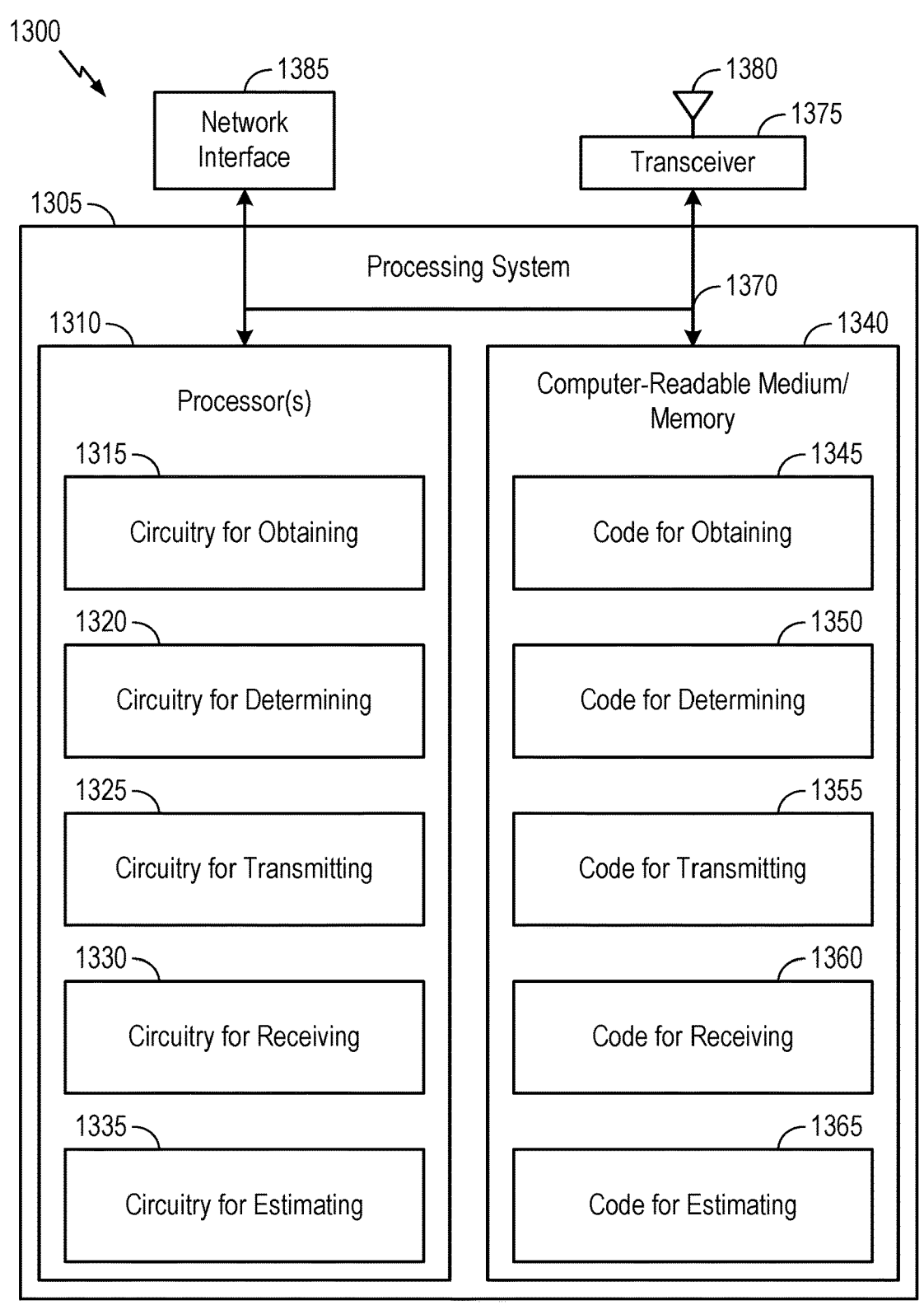
FIG. 13 depicts aspects of an example communications device.

In certain aspects, method 1100, or any aspect related to it, may be performed by an apparatus, such as communications device 1300 of FIG. 13, which includes various components operable, configured, or adapted to perform the method 1100. Communications device 1300 is described below in further detail.

Note that FIG. 11 is just one example of a method, and other methods including fewer, additional, or alternative steps are possible consistent with this disclosure.

FIG. 12 shows a method 1200 for wireless communications by an apparatus, such as UE 104 of FIGS. 1, 3, 5, 7, and 9.

Method 1200 begins at step 1205 with receiving, from a terrestrial network entity, constellation information and trajectory information of one or more NTN entities in a NTN. For example, a UE 104 may obtain the constellation information and the trajectory information from the NTN or the TN as described with reference to FIGS. 9-10.

Method 1200 then proceeds to step 1210 with computing an estimated received power at an NTN entity of the one or more NTN entities for a transmission from the apparatus to the NTN entity based on the constellation information and the trajectory information of the NTN, a predicted path loss from the apparatus to the NTN entity, a transmit power of the apparatus and an antenna gain of the apparatus. For example, the aforementioned computations by the UE 104 correspond to process depicted and described with reference to steps 1006 of FIG. 10.

Method 1200 then proceeds to step 1215 with determining whether the estimated received power at the NTN entity is greater than a threshold stored in the one or more memories. For example, the UE 104 may determine whether the estimated received power at the NTN entity is greater than a threshold as described with reference to step 1008 of FIG. 10.

Method 1200 then proceeds to step 1220 with adjusting, based on a determination that the estimated received power at the NTN entity is greater than the threshold, an antenna configuration or a beamforming configuration for transmission between the apparatus and the terrestrial network entity thereby reducing interference to the NTN entity caused by transmission with the terrestrial network entity. For example, the UE 104 may adjust the antenna configuration or the beamforming configuration as described with reference to at least steps 1012-1014 of FIG. 10.

In certain aspects, method 1200 further includes receiving, from the terrestrial network entity, a timeframe to adjust the antenna configuration or the beamforming configuration.

In certain aspects, method 1200 further includes executing an adjustment of the antenna configuration or the beamforming configuration during the timeframe.

In certain aspects, method 1200 further includes returning the antenna configuration or the beamforming configuration to a pre-adjustment configuration after the timeframe.

In certain aspects, the timeframe corresponds to the NTN entity being located within a signal projection cone, the signal projection cone defining a projection of a beam used for communication between the apparatus and the terrestrial network entity.

In certain aspects, method 1200 further includes receiving, from the terrestrial network entity, one or more criterion comprising at least one of (1) when to adjust the antenna configuration or the beamforming configuration or (2) how to adjust the antenna configuration or the beamforming configuration.

In certain aspects, method 1200 further includes storing the one or more criterion in the one or more memories.

In certain aspects, method 1200 further includes determining whether the antenna gain of the apparatus, a transmit power of the apparatus, a path loss from the apparatus to the terrestrial network entity, and a signal quality toward the terrestrial network entity each meet a preconfigured value after the adjustment of the antenna configuration or the beamforming configuration for transmission between the apparatus and the terrestrial network entity.

In certain aspects, method 1200 further includes adjusting, based on a determination that the antenna gain of the apparatus, the transmit power of the apparatus, the path loss from the apparatus to the terrestrial network entity, or the signal quality toward the terrestrial network entity does not meet the preconfigured value, the antenna configuration or the beamforming configuration.

In certain aspects, the constellation information and the trajectory information of the NTN are obtained from a broadcasted system information block (SIB) from the terrestrial network entity.

In certain aspects, the constellation information and the trajectory information of the NTN are obtained from a radio resource control (RRC) message from the terrestrial network entity.

In certain aspects, method 1200 further includes receiving, from the terrestrial network entity, a validity duration, wherein the validity duration indicates when the constellation information and the trajectory information of the NTN or one or more criterion comprising how to adjust the antenna configuration or the beamforming configuration are valid.

In certain aspects, method 1200 further includes applying the adjustment of the antenna configuration or the beamforming configuration during the validity duration.

In certain aspects, step 1220 includes reducing an antenna gain of one or more antenna elements of an antenna that are directed to the NTN entity.

In certain aspects, method 1200 further includes obtaining a real-time NTN entity position from an orbital propagation model.

In certain aspects, method 1200 further includes obtaining, from a gyroscope of the apparatus, a motion of the apparatus.

In certain aspects, method 1200 further includes obtaining a location of the terrestrial network entity and a location of the apparatus.

In certain aspects, method 1200 further includes determining, for one or more intervals of time, adjustments to the antenna configuration or the beamforming configuration based on the real-time NTN entity position, the motion of the apparatus, the location of the terrestrial network entity, the location of the apparatus, an uplink transmit power, and one or more characteristics of the antenna configuration.

In certain aspects, method 1200 further includes executing the adjustments of the antenna configuration or the beamforming configuration corresponding to the one or more intervals of time.

In certain aspects, method 1200 further includes transmitting an indication to the terrestrial network entity indicating when or how the antenna configuration or the beamforming configuration are adjusted.

Figure 14:
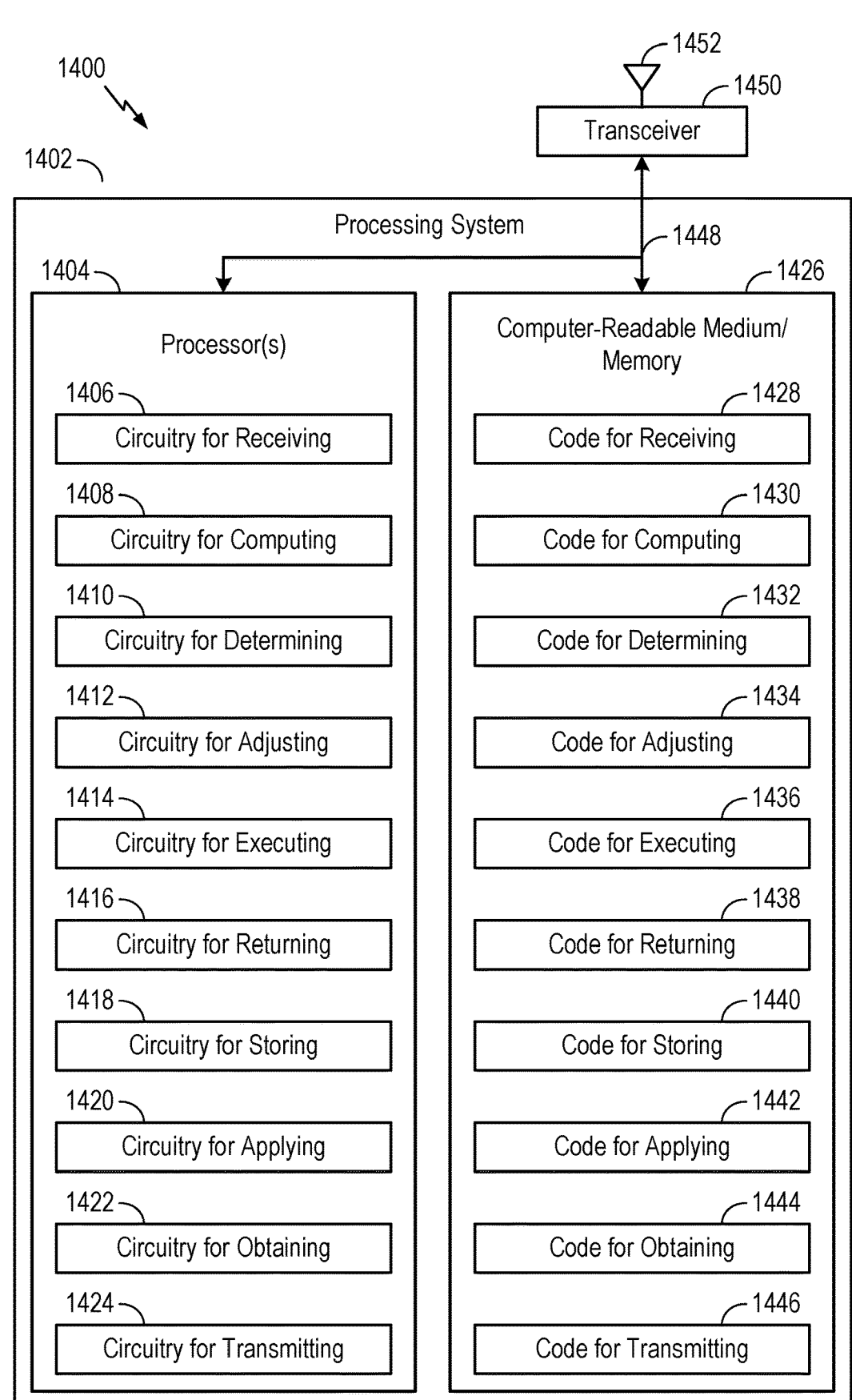
FIG. 14 depicts aspects of an example communications device.

In certain aspects, method 1200, or any aspect related to it, may be performed by an apparatus, such as communications device 1400 of FIG. 14, which includes various components operable, configured, or adapted to perform the method 1200. Communications device 1400 is described below in further detail.

Note that FIG. 12 is just one example of a method, and other methods including fewer, additional, or alternative steps are possible consistent with this disclosure.

Example Communications Devices

FIG. 13 depicts aspects of an example communications device 1300. In some aspects, communications device 1300 is a network entity, such as BS 102 of FIGS. 1 and 3, or a disaggregated base station as discussed with respect to FIG. 2.

The communications device 1300 includes a processing system 1305 coupled to a transceiver 1375 (e.g., a transmitter and/or a receiver) and/or a network interface 1385. The transceiver 1375 is configured to transmit and receive signals for the communications device 1300 via an antenna 1380, such as the various signals as described herein. The network interface 1385 is configured to obtain and send signals for the communications device 1300 via communications link(s), such as a backhaul link, midhaul link, and/or fronthaul link as described herein, such as with respect to FIG. 2. The processing system 1305 may be configured to perform processing functions for the communications device 1300, including processing signals received and/or to be transmitted by the communications device 1300.

The processing system 1305 includes one or more processors 1310. In various aspects, one or more processors 1310 may be representative of one or more of receive processor 338, transmit processor 320, TX MIMO processor 330, and/or controller/processor 340, as described with respect to FIG. 3. The one or more processors 1310 are coupled to a computer-readable medium/memory 1340 via a bus 1370. In certain aspects, the computer-readable medium/memory 1340 is configured to store instructions (e.g., computer-executable code) that when executed by the one or more processors 1310, enable and cause the one or more processors 1310 to perform the method 1100 described with respect to FIG. 11, or any aspect related to it, including any additional steps or sub-steps described in relation to FIG. 11. Note that reference to a processor of communications device 1300 performing a function may include one or more processors of communications device 1300 performing that function, such as in a distributed fashion.

In the depicted example, the computer-readable medium/memory 1340 stores code for obtaining 1345, code for determining 1350, code for transmitting 1355, code for receiving 1360, and code for estimating 1365. Processing of the code 1345-1365 may enable and cause the communications device 1300 to perform the method 1100 described with respect to FIG. 11, or any aspect related to it.

The one or more processors 1310 include circuitry configured to implement (e.g., execute) the code stored in the computer-readable medium/memory 1340, including circuitry for obtaining 1315, circuitry for determining 1320, circuitry for transmitting 1325, circuitry for receiving 1330, and circuitry for estimating 1335. Processing with circuitry 1315-1335 may enable and cause the communications device 1300 to perform the method 1100 described with respect to FIG. 11, or any aspect related to it.

More generally, means for communicating, transmitting, sending or outputting for transmission may include the transceivers 332, antenna(s) 334, transmit processor 320, TX MIMO processor 330, and/or controller/processor 340 of the BS 102 illustrated in FIG. 3, transceiver 1375 and/or antenna 1380 of the communications device 1300 in FIG. 13, and/or one or more processors 1310 of the communications device 1300 in FIG. 13. Means for communicating, receiving or obtaining may include the transceivers 332, antenna(s) 334, receive processor 338, and/or controller/processor 340 of the BS 102 illustrated in FIG. 3, transceiver 1375 and/or antenna 1380 of the communications device 1300 in FIG. 13, and/or one or more processors 1310 of the communications device 1300 in FIG. 13.

FIG. 14 depicts aspects of an example communications device 1400. In some aspects, communications device 1400 is a user equipment, such as UE 104 described above with respect to FIGS. 1 and 3.

The communications device 1400 includes a processing system 1402 coupled to a transceiver 1450 (e.g., a transmitter and/or a receiver). The transceiver 1450 is configured to transmit and receive signals for the communications device 1400 via an antenna 1452, such as the various signals as described herein. The processing system 1402 may be configured to perform processing functions for the communications device 1400, including processing signals received and/or to be transmitted by the communications device 1400.

The processing system 1402 includes one or more processors 1404. In various aspects, the one or more processors 1404 may be representative of one or more of receive processor 358, transmit processor 364, TX MIMO processor 366, and/or controller/processor 380, as described with respect to FIG. 3. The one or more processors 1404 are coupled to a computer-readable medium/memory 1426 via a bus 1448. In certain aspects, the computer-readable medium/memory 1426 is configured to store instructions (e.g., computer-executable code) that when executed by the one or more processors 1404, enable and cause the one or more processors 1404 to perform the method 1200 described with respect to FIG. 12, or any aspect related to it, including any additional steps or sub-steps described in relation to FIG. 12. Note that reference to a processor performing a function of communications device 1400 may include one or more processors performing that function of communications device 1400, such as in a distributed fashion.

In the depicted example, computer-readable medium/memory 1426 stores code for receiving 1428, code for computing 1430, code for determining 1432, code for adjusting 1434, code for executing 1436, code for returning 1438, code for storing 1440, code for applying 1442, code for obtaining 1444, and code for transmitting 1446. Processing of the code 1428-1446 may enable and cause the communications device 1400 to perform the method 1200 described with respect to FIG. 12, or any aspect related to it.

The one or more processors 1404 include circuitry configured to implement (e.g., execute) the code stored in the computer-readable medium/memory 1426, including circuitry for receiving 1406, circuitry for computing 1408, circuitry for determining 1410, circuitry for adjusting 1412, circuitry for executing 1414, circuitry for returning 1416, circuitry for storing 1418, circuitry for applying 1420, circuitry for obtaining 1422, and circuitry for transmitting 1424. Processing with circuitry 1406-1424 may enable and cause the communications device 1400 to perform the method 1200 described with respect to FIG. 12, or any aspect related to it.

More generally, means for communicating, transmitting, sending or outputting for transmission may include the transceivers 354, antenna(s) 352, transmit processor 364, TX MIMO processor 366, and/or controller/processor 380 of the UE 104 illustrated in FIG. 3, transceiver 1450 and/or antenna 1452 of the communications device 1400 in FIG. 14, and/or one or more processors 1404 of the communications device 1400 in FIG. 14. Means for communicating, receiving or obtaining may include the transceivers 354, antenna(s) 352, receive processor 358, and/or controller/processor 380 of the UE 104 illustrated in FIG. 3, transceiver 1450 and/or antenna 1452 of the communications device 1400 in FIG. 14, and/or one or more processors 1404 of the communications device 1400 in FIG. 14.

EXAMPLE CLAUSES

Implementation examples are described in the following numbered clauses:

Clause 1: A method for wireless communications by an apparatus comprising: obtaining constellation information and trajectory information of one or more NTN entities in a NTN; determining a position of a UE in communication with the apparatus; determining a signal projection cone based on the position of the user equipment, a position of the apparatus, and a beam width of a beam used for the communication between the user equipment and the apparatus; determining that the one or more NTN entities are located within the signal projection cone; and transmitting a first signal to the user equipment based on the determination that the one or more NTN entities are located within the signal projection cone.

Clause 2: The method of Clause 1, wherein the first signal indicates to the user equipment to modify an uplink power control parameter.

Clause 3: The method of Clause 2, wherein the uplink power control parameter is a path loss value associated with the one or more NTN entities determined to be located within the signal projection cone.

Clause 4: The method of Clause 3, further comprising receiving the path loss value from the user equipment.

Clause 5: The method of Clause 3, further comprising: estimating the path loss value associated with the one or more NTN entities based on the position of the user equipment and the position of the apparatus; and transmitting the estimated path loss value to the user equipment via a downlink MAC-CE.

Clause 6: The method of Clause 3, further comprising: estimating the path loss value associated with the one or more NTN entities based on the position of the user equipment and the position of the apparatus; and transmitting the estimated path loss value to the user equipment via a DCI IE.

Clause 7: The method of any one of Clauses 1-6, wherein: the apparatus comprises two or more TRP to which the user equipment is connected; the signal projection cone corresponds to a projection of the beam between the user equipment and a first TRP of the two or more TRPs of the apparatus; and the method further comprises transmitting, based on the determination that the one or more NTN entities are located within the signal projection cone corresponding to the projection of the beam between the user equipment and the first TRP of the two or more TRPs of the apparatus, a second signal to the user equipment to switch from STxMP mode with the two or more TRPs to s-TRP mode with a second TRP of the two or more TRPs.

Clause 8: The method of Clause 7, further comprising determining a timeframe when the one or more NTN entities are located within the signal projection cone corresponding to the projection of the beam between the user equipment and the first TRP.

Clause 9: The method of Clause 8, wherein the second signal comprises a timer value corresponding to the timeframe, wherein the timer value indicates to the user equipment a duration to operate in the s-TRP mode before switching back to STxMP mode.

Clause 10: The method of any one of Clauses 1-9, wherein obtaining the constellation information and the trajectory information of the NTN further comprises receiving, from the NTN via an application function, the constellation information and the trajectory information of the NTN.

Clause 11: The method of any one of Clauses 1-10, wherein obtaining the constellation information and the trajectory information of the NTN further comprises receiving the constellation information and the trajectory information of the NTN from a terrestrial network via an NG interface.

Clause 12: The method of any one of Clauses 1-11, wherein obtaining the constellation information and the trajectory information of the NTN further comprises receiving the constellation information and the trajectory information of the NTN from an NTN entity via an Xn interface.

Clause 13: The method of any one of Clauses 1-12, further comprising: determining a timeframe when the one or more NTN entities are located within the signal projection cone; and transmitting, during the timeframe, the constellation information and the trajectory information of the NTN to one or more user equipments.

Clause 14: The method of any one of Clauses 1-13, further comprising: receiving, from one of the one or more NTN entities, a request to cause the user equipment to adjust an antenna configuration or a beamforming configuration; and transmitting the constellation information and the trajectory information of the NTN to one or more user equipments based on the received request.

Clause 15: A method for wireless communications by an apparatus comprising: receiving, from a terrestrial network entity, constellation information and trajectory information of one or more NTN entities in a NTN; computing an estimated received power at an NTN entity of the one or more NTN entities for a transmission from the apparatus to the NTN entity based on the constellation information and the trajectory information of the NTN, a predicted path loss from the apparatus to the NTN entity, a transmit power of the apparatus and an antenna gain of the apparatus; determining whether the estimated received power at the NTN entity is greater than a threshold stored in the one or more memories; and adjusting, based on a determination that the estimated received power at the NTN entity is greater than the threshold, an antenna configuration or a beamforming configuration for transmission between the apparatus and the terrestrial network entity thereby reducing interference to the NTN entity caused by transmission with the terrestrial network entity.

Clause 16: The method of Clause 15, further comprising: receiving, from the terrestrial network entity, a timeframe to adjust the antenna configuration or the beamforming configuration; executing an adjustment of the antenna configuration or the beamforming configuration during the timeframe; and returning the antenna configuration or the beamforming configuration to a pre-adjustment configuration after the timeframe.

Clause 17: The method of Clause 16, wherein the timeframe corresponds to the NTN entity being located within a signal projection cone, the signal projection cone defining a projection of a beam used for communication between the apparatus and the terrestrial network entity.

Clause 18: The method of any one of Clauses 15-17, further comprising: receiving, from the terrestrial network entity, one or more criterion comprising at least one of (1) when to adjust the antenna configuration or the beamforming configuration or (2) how to adjust the antenna configuration or the beamforming configuration; and storing the one or more criterion in the one or more memories.

Clause 19: The method of any one of Clauses 15-18, further comprising: determining whether the antenna gain of the apparatus, a transmit power of the apparatus, a path loss from the apparatus to the terrestrial network entity, and a signal quality toward the terrestrial network entity each meet a preconfigured value after the adjustment of the antenna configuration or the beamforming configuration for transmission between the apparatus and the terrestrial network entity; and adjusting, based on a determination that the antenna gain of the apparatus, the transmit power of the apparatus, the path loss from the apparatus to the terrestrial network entity, or the signal quality toward the terrestrial network entity does not meet the preconfigured value, the antenna configuration or the beamforming configuration.

Clause 20: The method of any one of Clauses 15-19, wherein the constellation information and the trajectory information of the NTN are obtained from a broadcasted system information block (SIB) from the terrestrial network entity.

Clause 21: The method of any one of Clauses 15-20, wherein the constellation information and the trajectory information of the NTN are obtained from a radio resource control (RRC) message from the terrestrial network entity.

Clause 22: The method of any one of Clauses 15-21, further comprising: receiving, from the terrestrial network entity, a validity duration, wherein the validity duration indicates when the constellation information and the trajectory information of the NTN or one or more criterion comprising how to adjust the antenna configuration or the beamforming configuration are valid; and applying the adjustment of the antenna configuration or the beamforming configuration during the validity duration.

Clause 23: The method of any one of Clauses 15-22, wherein adjusting the antenna configuration or the beamforming configuration further comprises reducing an antenna gain of one or more antenna elements of an antenna that are directed to the NTN entity.

Clause 24: The method of any one of Clauses 15-23, further comprising: obtaining a real-time NTN entity position from an orbital propagation model; obtaining, from a gyroscope of the apparatus, a motion of the apparatus; obtaining a location of the terrestrial network entity and a location of the apparatus; determining, for one or more intervals of time, adjustments to the antenna configuration or the beamforming configuration based on the real-time NTN entity position, the motion of the apparatus, the location of the terrestrial network entity, the location of the apparatus, an uplink transmit power, and one or more characteristics of the antenna configuration; and executing the adjustments of the antenna configuration or the beamforming configuration corresponding to the one or more intervals of time.

Clause 25: The method of any one of Clauses 15-24, further comprising: transmitting an indication to the terrestrial network entity indicating when or how the antenna configuration or the beamforming configuration are adjusted.

Clause 26: One or more apparatuses, comprising: one or more memories comprising executable instructions; and one or more processors configured to execute the executable instructions and cause the one or more apparatuses to perform a method in accordance with any one of clauses 1-25.

Clause 27: One or more apparatuses, comprising means for performing a method in accordance with any one of clauses 1-25.

Clause 28: One or more non-transitory computer-readable media comprising executable instructions that, when executed by one or more processors of one or more apparatuses, cause the one or more apparatuses to perform a method in accordance with any one of clauses 1-25.

Clause 29: One or more computer program products embodied on one or more computer-readable storage media comprising code for performing a method in accordance with any one of clauses 1-25.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, an AI processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." The subsequent use of a definite article (e.g., "the" or "said") with an element (e.g., "the processor") is not intended to invoke a singular meaning (e.g., "only one") on the element unless otherwise specifically stated. For example, reference to an element (e.g., "a processor," "a controller," "a memory," "a transceiver," "an antenna," "the processor," "the controller," "the memory," "the transceiver," "the antenna," etc.), unless otherwise specifically stated, should be understood to refer to one or more elements (e.g., "one or more processors," "one or more controllers," "one or more memories," "one or more transceivers," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. A ground-based terrestrial network (TN) entity configured for wireless communications, comprising: one or more memories comprising processor-executable instructions; and one or more processors configured to execute the processor-executable instructions and cause the TN entity to:

obtain constellation information and trajectory information of one or more non-terrestrial network (NTN) entities in a NTN, from the one or more NTN entities, wherein the one or more NTN entities are configured to fly or orbit with respect to a surface of Earth;

determine a position of a user equipment (UE) in communication with the TN entity, based on position information provided by the UE;

determine a signal projection cone based on the position of the UE, a position of the TN entity, and a beam width of a beam used for the communication between the UE and the TN entity;

determine that the one or more NTN entities are located within the signal projection cone based on a geometry of the signal projection cone and the constellation information and the trajectory information of the one or more NTN entities; and transmit a first signal corresponding to an uplink power control parameter to the UE based on the determination that the one or more NTN entities are located within the signal projection cone to reduce interference with the one or more NTN entities.

2. The TN entity of claim 1, wherein the first signal indicates to the UE to modify the uplink power control parameter.

3. The TN entity of claim 2, wherein the uplink power control parameter is a path loss value associated with the one or more NTN entities determined to be located within the signal projection cone.

4. The TN entity of claim 3, wherein the one or more processors are configured to execute the processor-executable instructions and cause the TN entity to receive the path loss value from the UE.

5. The TN entity of claim 3, wherein the one or more processors are configured to execute the processor-executable instructions and cause the TN entity to:

estimate the path loss value associated with the one or more NTN entities based on the position of the UE and the position of the TN entity; and transmit the estimated path loss value to the UE via a downlink medium access control (MAC) control element (CE).

6. The TN entity of claim 3, wherein the one or more processors are configured to execute the processor-executable instructions and cause the TN entity to:

estimate the path loss value associated with the one or more NTN entities based on the position of the UE and the position of the TN entity; and transmit the estimated path loss value to the UE via a downlink control information (DCI) information element (IE).

7. The TN entity of claim 1, wherein:

the TN entity comprises two or more transmission and reception points (TRP) to which the UE is connected, the signal projection cone corresponds to a projection of the beam between the UE and a first TRP of the two or more TRPs of the TN entity, and the one or more processors are configured to execute the processor-executable instructions and cause the TN entity to:

transmit, based on the determination that the one or more NTN entities are located within the signal projection cone corresponding to the projection of the beam between the UE and the first TRP of the two or more TRPs of the TN entity, a second signal to the UE to switch from simultaneous transmission across multiple panels (STxMP) mode with the two or more TRPs to single transmission and reception point (s-TRP) mode with a second TRP of the two or more TRPs.

8. The TN entity of claim 7, wherein the one or more processors are configured to execute the processor-executable instructions and cause the TN entity to determine a timeframe when the one or more NTN entities are located within the signal projection cone corresponding to the projection of the beam between the UE and the first TRP.

9. The TN entity of claim 8, wherein the second signal comprises a timer value corresponding to the timeframe, wherein the timer value indicates to the UE a duration to operate in the s-TRP mode before switching back to STxMP mode.

10. The TN entity of claim 1, wherein to obtain the constellation information and the trajectory information of the NTN, the one or more processors are configured to execute the processor-executable instructions and cause the TN entity to receive, from the NTN via an application function, the constellation information and the trajectory information of the NTN.

11. The TN entity of claim 1, wherein to obtain the constellation information and the trajectory information of the NTN, the one or more processors are configured to execute the processor-executable instructions and cause the TN entity to receive the constellation information and the trajectory information of the NTN from a terrestrial network via an NG interface.

12. The TN entity of claim 1, wherein to obtain the constellation information and the trajectory information of the NTN, the one or more processors are configured to execute the processor-executable instructions and cause the TN entity to receive the constellation information and the trajectory information of the NTN from an NTN entity via an Xn interface.

13. The TN entity of claim 1, wherein the one or more processors are configured to execute the processor-executable instructions and further cause the TN entity to:

determine a timeframe when the one or more NTN entities are located within the signal projection cone; and transmit, during the timeframe, the constellation information and the trajectory information of the NTN to one or more user equipments.

14. The TN entity of claim 1, wherein the one or more processors are configured to execute the processor-executable instructions and further cause the TN entity to:

receive, from one of the one or more NTN entities, a request to cause the UE to adjust an antenna configuration or a beamforming configuration; and transmit the constellation information and the trajectory information of the NTN to one or more user equipments based on the received request.

15. A user equipment (UE) configured for wireless communications, comprising: one or more memories comprising processor-executable instructions; and one or more processors configured to execute the processor-executable instructions and cause the UE to:

receive, from a ground-based terrestrial network (TN) entity, constellation information and trajectory information of one or more non-terrestrial network (NTN) entities in a non-terrestrial network (NTN), wherein the one or more NTN entities are configured to fly or orbit with respect to a surface of Earth;

compute a predicted path loss between a position of the UE and a position of an NTN entity of the one or more NTN entities based on the constellation information and the trajectory information;

compute an estimated received power at the NTN entity of the one or more NTN entities for a transmission from the UE to the NTN entity based on the constellation information and the trajectory information of the NTN, the predicted path loss from the UE to the NTN entity, and a transmit power of the UE;

determine that the estimated received power at the NTN entity is greater than a threshold stored in the one or more memories; and adjust, based on a determination that the estimated received power at the NTN entity is greater than the threshold, an antenna configuration or a beamforming configuration for transmission between the UE and the TN entity thereby reducing interference to the NTN entity caused by transmission with the TN entity.

16. The UE of claim 15, wherein the one or more processors are configured to execute the processor-executable instructions and cause the UE to:

receive, from the TN entity, a timeframe to adjust the antenna configuration or the beamforming configuration;

execute an adjustment of the antenna configuration or the beamforming configuration during the timeframe; and return the antenna configuration or the beamforming configuration to a pre-adjustment configuration after the timeframe.

17. The UE of claim 16, wherein the timeframe corresponds to the NTN entity being located within a signal projection cone, the signal projection cone defining a projection of a beam used for communication between the UE and the TN entity.

18. The UE of claim 15, wherein the one or more processors are configured to execute the processor-executable instructions and cause the UE to:

receive, from the TN entity, one or more criterion comprising at least one of (1) when to adjust the antenna configuration or the beamforming configuration or (2) how to adjust the antenna configuration or the beamforming configuration; and store the one or more criterion in the one or more memories.

19. The UE of claim 15, wherein the one or more processors are configured to execute the processor-executable instructions and cause the UE to:

determine that a transmit power of the UE, a path loss from the UE to the TN entity, and a signal quality toward the TN entity each meet a preconfigured value after the adjustment of the antenna configuration or the beamforming configuration for transmission between the UE and the TN entity; and based on a determination that the transmit power of the UE, the path loss from the UE to the TN entity, or the signal quality toward the TN entity does not meet the preconfigured value, adjust the antenna configuration or the beamforming configuration.

20. The UE of claim 15, wherein the constellation information and the trajectory information of the NTN are obtained from a broadcasted system information block (SIB) from the TN entity.

21. The UE of claim 15, wherein the constellation information and the trajectory information of the NTN are obtained from a radio resource control (RRC) message from the TN entity.

22. The UE of claim 15, wherein the one or more processors are configured to execute the processor-executable instructions and cause the UE to:

receive, from the TN entity, a validity duration, wherein the validity duration indicates when the constellation information and the trajectory information of the NTN or one or more criterion comprising how to adjust the antenna configuration or the beamforming configuration are valid; and apply the adjustment of the antenna configuration or the beamforming configuration during the validity duration.

23. The UE of claim 15, wherein to adjust the antenna configuration or the beamforming configuration, the one or more processors are configured to reduce an antenna gain of one or more antenna elements of an antenna that are directed to the NTN entity.

24. The UE of claim 15, the one or more processors are configured to execute the processor-executable instructions and cause the UE to:

obtain a real-time NTN entity position from an orbital propagation model;

obtain, from a gyroscope of the UE, a motion of the UE;

obtain a location of the TN entity and a location of the UE;

determine, for one or more intervals of time, adjustments to the antenna configuration or the beamforming configuration based on the real-time NTN entity position, the motion of the UE, the location of the TN entity, the location of the UE, an uplink transmit power, and one or more characteristics of the antenna configuration; and execute the adjustments of the antenna configuration or the beamforming configuration corresponding to the one or more intervals of time.

25. The UE of claim 15, wherein the one or more processors are configured to execute the processor-executable instructions and cause the UE to transmit an indication to the TN entity indicating when or how the antenna configuration or the beamforming configuration are adjusted.

26. A method for wireless communications by a ground-based terrestrial network (TN) entity, the method comprising:

obtaining constellation information and trajectory information of one or more non-terrestrial network (NTN) entities in a NTN, from the one or more NTN entities, wherein the one or more NTN entities are configured to fly or orbit with respect to a surface of Earth;

determining a position of a user equipment (UE) in communication with the TN entity, based on position information provided by the UE;

determining a signal projection cone based on the position of the UE, a position of the TN entity, and a beam width of a beam used for the communication between the UE and the TN entity;

determining that the one or more NTN entities are located within the signal projection cone based on a geometry of the signal projection cone and the constellation information and the trajectory information of the one or more NTN entities; and transmitting a first signal corresponding to an uplink power control parameter to the UE based on the determination that the one or more NTN entities are located within the signal projection cone to reduce interference with the one or more NTN entities.

27. A method for wireless communications by a user equipment (UE) comprising:

receiving, from a ground-based terrestrial network (TN) entity, constellation information and trajectory information of one or more non-terrestrial network (NTN) entities in a NTN, wherein the one or more NTN entities are configured to fly or orbit with respect to a surface of Earth;

computing a predicted path loss between a position of the UE and a position of an NTN entity of the one or more NTN entities based on the constellation information and the trajectory information;

computing an estimated received power at the NTN entity of the one or more NTN entities for a transmission from the UE to the NTN entity based on the constellation information and the trajectory information of the NTN, the predicted path loss from the UE to the NTN entity, and a transmit power of the UE;

determining that the estimated received power at the NTN entity is greater than a threshold stored in one or more memories of the UE; and adjusting, based on a determination that the estimated received power at the NTN entity is greater than the threshold, an antenna configuration or a beamforming configuration for transmission between the UE and the TN entity thereby reducing interference to the NTN entity caused by transmission with the TN entity.

* * * * *